COMMUNICATION AND RADIO GUIDANCE SYSTEM

Original Filed April 29, 1944 11 Sheets-Sheet 1

INVENTORS
EDMOND M. DELORAINE
PAUL R. ADAMS
BY
R P Morris
ATTORNEY

COMMUNICATION AND RADIO GUIDANCE SYSTEM

Original Filed April 29, 1944 11 Sheets-Sheet 2

INVENTOR.
EDMOND M. DELORAINE
PAUL R. ADAMS
BY
R P Morris
ATTORNEY

COMMUNICATION AND RADIO GUIDANCE SYSTEM

Original Filed April 29, 1944 11 Sheets-Sheet 3

INVENTORS
EDMOND M. DELORAINE
PAUL R. ADAMS
BY
[signature]
ATTORNEY

COMMUNICATION AND RADIO GUIDANCE SYSTEM

Original Filed April 29, 1944 11 Sheets-Sheet 4

INVENTORS
EDMOND M. DELORAINE
PAUL R. ADAMS
BY
[signature]
ATTORNEY

COMMUNICATION AND RADIO GUIDANCE SYSTEM

Original Filed April 29, 1944 11 Sheets-Sheet 5

INVENTORS
EDMOND M. DELORAINE
PAUL R. ADAMS
BY
R P Morris
ATTORNEY

COMMUNICATION AND RADIO GUIDANCE SYSTEM

Original Filed April 29, 1944 11 Sheets-Sheet 6

INVENTORS
EDMOND M. DELORAINE
PAUL R. ADAMS
BY
R. P. Morris
ATTORNEY

INVENTORS
EDMOND M. DELORAINE
PAUL R. ADAMS
BY
R. P. Morris
ATTORNEY

INVENTORS
EDMOND M. DELORAINE
PAUL R. ADAMS
BY
R. P. Morris
ATTORNEY

INVENTORS
EDMOND M. DELORAINE
PAUL R. ADAMS
BY
R P Morris
ATTORNEY

Dec. 26, 1950 E. M. DELORAINE ET AL 2,535,048

COMMUNICATION AND RADIO GUIDANCE SYSTEM

Original Filed April 29, 1944 11 Sheets-Sheet 10

INVENTORS
EDMOND M. DELORAINE
PAUL R. ADAMS

BY

R.P. Morris
ATTORNEY

INVENTORS
EDMOND M. DELORAINE
PAUL R. ADAMS
BY R P Morris
ATTORNEY

Patented Dec. 26, 1950 2,535,048

UNITED STATES PATENT OFFICE 2,535,048

COMMUNICATION AND RADIO GUIDANCE SYSTEM

Edmond M. Deloraine, Paris, France, and Paul R. Adams, Cranford, N. J., assignors to Federal Telephone and Radio Corporation, New York, N. Y., a corporation of Delaware Original application April 29, 1944, Serial No. 533,322. Divided and this application December 15, 1945, Serial No. 635,340

6 Claims. (Cl. 343—6)

This invention relates to airplane guiding and traffic control systems and pertains more particularly to radio systems for guiding airplanes along established routes and in approaching, landing and taking off from airfields; this being a division of our copending application for "Traffic Control Systems," Serial No. 533,322, filed April 29, 1944 which issued September 12, 1950 as Patent No. 2,521,697.

One of the objects of our invention is to provide a system of aids to navigation and traffic control for use in extended operation of aircraft so as to permit regular operation by a standardized procedure under all weather conditions. Certain other objects of the invention involved in this system include the provision of methods and means to meet the following requirements:

*a.* The use of a minimum amount of radio equipment on the airplane.
*b.* The use of a minimum number of frequency channels.
*c.* Simplicity of operation and indication.
*d.* An operating procedure remaining substantially the same in all weather conditions.
*e.* The use of speech communication to give basic instructions from the ground to the airplane, and the provision of instruments on the airplane suitable for carrying out these instructions.
*f.* The provision of information on the ground sufficient to supervise all planes' movements, to check that they are correct or to issue supplementary instructions.
*g.* The possibility of gradual introduction of parts of the system.

The growth of military or civil aviation as a transportation service has been marked so far by a number of progressive steps in the solution of a number of individual problems as the full importance of each became apparent.

While step-by-step progress in the minimization of natural and artificial limitations had the advantage of presenting the problems successively, it resulted in a decided disadvantage in that these individual solutions of problems have resulted in the development of equipments that are largely unrelated and independent, each requiring its own frequency and antenna and in total adding considerablly to the airplane load and drag thus involving a cost and maintenance problem of some importance.

In order to obviate many of the difficulties of prior systems and to simplify the apparatus required on the airplane, while at the same time offering other advantages, a further object of our invention is to provide a "universal system" involving the following principles:

*a.* Several guiding and other functions are combined with a corresponding saving in equipment and frequencies.
*b.* Several functions are carried out successively in time in order to share the time among a number of successive functions with a corresponding saving in equipment and frequencies.

In accordance with the present invention, airport traffic control of planes prior to landing is effected by giving the airplanes such information that they can follow circular paths centered on the airport. The radio ranges which define the airways leading to the airport are connected with the circles by tangential paths or branches which are used for arrival and departure of the airplanes. The circles are characterized by specific radii and altitudes and any number of such circles may readily be provided. Ordinarily only one circle for a given altitude will be required but more than one circle could be provided if desired. Means is provided for advising the airplanes following these circles of their angular position with respect to the center or what is equivalent, their position along the circular path in which they are supposed to be flying.

The information required on the ground at the airport traffic control station is essentially the following:

*a.* Knowledge of the position, altitude and identification of all planes following the air route determined by the radio ranges.
*b.* Knowledge of the position, altitude and identification of all planes following the circular paths around the airport (before entering a runway localizer beam for landing or after leaving a take-off runway).
*c.* Ability to check all movements of planes.

For safe guidance and control of aircraft along airways, the following radio information and facilities are required by each airplane:

*a.* An indication of left-right location i. e., whether right or left of the airway (generally known as the radio range facility).
*b.* An indication of left-right altitude i. e., whether headed left or right of the next station ahead on the airway (generally known as the homing facility).

c. A knowledge of altitude above ground (generally known as the terrain clearance facility).
d. A knowledge of position along the airway (hereinafter called the self-distance facility).
e. A knowledge of nearby aircraft (generally known as the anti-collision facility).
f. One or more channels for short range two-way telephone communication with airplanes nearby.
g. A larger number of channels for longer range two-way telephone communication with the distant airbases from any point on the airway.

The airways control center such as a terminal airport requires the following information facilities:

g'. A suitable number of channels for two-way telephone communication with all planes along the route for giving traffic control instructions and weather information. (This is the same as the above listed service *g*, considered from the opposite viewpoint.)
h. A knowledge of the identities, altitudes and positions of all planes along the airway.
i. A number of telephone, telegraph and facsimile circuits between airports for exchanging traffic information, weather maps and all other messages as required.

The number of radio frequency bands needed for providing even the present 200 commercial civilian airlines with present existing facilities would be substantially greater than the number of bands now allocated for all civilian aeronautical uses; and with increasing numbers of aircraft as expected the shortage of bands will become rapidly more acute. The difficulty of obtaining new allocations of frequencies, moreover, can be expected to be extremely great if the bands requested lie in the L. F. (low frequency), M. F. (medium frequency) or H. F. (high frequency) regions hereafter referred to as the "longer range" wavelengths, such difficulty being substantially less if the bands requested lie in the V. H. F. (very high frequency), U. H. F. (ultra high frequency) or S. H. F. (super high frequency) regions hereafter referred to as the "optical range" wavelengths. It is, thereafter, necessary at the outset to consider how many of the desired facilities can be satisfactorily taken care of by optical range radiations and how many really require the longer range wavelengths.

It is at once apparent that the terrain clearance, self-distance and anti-collision facilities above listed as *c*, *d* and *e* would normally be performed with the optical range wavelengths. It is also fairly clear that the plane-to-plane telephone communication above listed as *f* could be taken care of by optical range radiations. In addition the radio range and homing facilities above listed as *a* and *b* can be performed with "optical range" wavelengths if one is willing to increase the number of range stations by a factor of about two to one.

The equipments required on the ground are approximately as follows:

1. A number of radio range transmitters suitably spaced to maintain optical line of sight with any airplane flying along the airway.
2. A number of responders or similar equipments for giving self-distance indications to every plane flying along the airway.
3. A number of optical frequency two-way radio-telephone ground stations suitably spaced to maintain optical line of sight with any airplane flying along any of the airways.
4. A sufficient number of communication channels to interconnect all the radio-telephone stations mentioned in 3 above, with the flight control centers.
5. A number of radar equipments spaced along the airway at suitable intervals to maintain almost optical line of sight with any airplane flying along the airway.
6. A sufficient number of communication channels to interconnect the radar equipments mentioned in 5 above, with the flight control center.
7. A number of base-to-base telephone, telegraph and facsimile circuits between the airbases at the ends of the airway.

In the system of the present invention, it is further contemplated that the combination stations at which all the required communication and navigation facilities are to be concentrated should be spaced somewhat closer than in the past (which permits the use of smaller power not only at these stations but also in the airplane transmitters) and should each be provided with a tower of moderate height. By such arrangement, it is possible to provide an optical line of sight between each tower and the next one; and the proposed system takes advantage of this fact to provide the required group of communication channels between airports by means of a series of multi-channel U. H. F. or S. H. F. radio links between successive towers. A wide-band repeater equipment is provided in each tower, so that the successive radio links are joined together into a chain which forms an artery of communication, extending between airports and capable of carrying a number of communication channels.

The relay stations along the airway must be at such distances apart that there is an optical path between the tops of the successive towers installed at these stations. In order to limit the towers to less than 100 feet, the spacing will be 20 miles approximately in flat country and usually larger in regions of irregular level.

Each tower carries four antennas for radiating and receiving narrow beamed micro-wave links in both directions and also a two-way U. H. F. broad band repeater to join these links into a continuous chain. Such chain handles a multi-channel communication system between the distanct airbases. Such communication system carries all the base-to-base traffic including facsimile transmission service.

This multi-channel system may, in addition, have "outbranching channel" equipment for branching a few communication channels out from the artery at each tower or relay station and also "inbranching channel" equipment.

For example, a chain of towers extends east and west between two airbases. The western airbase may be referred to as the master base which primarily controls the facilities. Three channels from the eastbound artery from the master base may be branched out at each tower and five channels may be branched in from each tower into the westbound artery for reception at the master base. Of these three outbranching channels, two will be the same channels at all towers, while four of the five inbranching channels will likewise be the same channels at all towers, these being used to handle a quasi-radar service and synchronize the transmissions of the radio range facilities as more fully explained hereinafter.

The remaining channel which is branched out at each tower as well as the remaining channel which is branched into the artery at each tower may be connected respectively to speech modulate a fixed-tuned low power V. H. F. radio-telephone transmitter and to receive speech from a fixed-tuned V. H. F. radio-telephone receiver for communication with airplanes near such tower. The two channels which are thus branched in and out at any given tower for two-way plane-to-base telephony will be different channels from those similarly used at the adjacent towers, in order that a number of different pairs of channels will be available along the airway for simultaneous speech between the western base and a number of different airplanes. The channels used for such plane-to-base telephony may be repeated every few towers, however, so as to require only six to twelve eastbound and six to twelve westbound channls even for a long air route having twenty to thirty towers. The V. H. F. radio frequencies used to carry the communications between the towers and the airplanes may also be repeated every few towers so that the airplanes' V. H. F. radio-telephone equipments need only be capable of selecting five or six different pairs of frequencies while yet permitting six to twelve simultaneous conversations depending on the number of channels. Many different allocations of channels and frequencies may be made in accordance with operating requirements, one or two typical arrangements being given by way of example in the more detailed description which follows.

As many channels as required can thus be provided for plane-to-ground use over long distances without requiring any frequencies other than five or six V. H. F. speech bands used in the airplane radio-telephone equipment and the two wide bands used for the chain of tower-to-tower links. It is especially to be noted that long range plane-to-base telephone is thereby accomplished without the use of a single one of the scarce long range wavelengths below 30 mc.

One channel of the airplane V. H. F. equipment can be reserved for direct communication with airplanes nearby. If communication is desired between planes too far apart for direct interworking, such communication can be carried on through the chain of towers in the same manner as a plane-to-base communication.

Heretofore desired information, whether required directly at the airport or for relaying along the airways or on the aircraft, as the case may be, could be obtained or given only by a combination of known methods involving a number of different frequencies and several independent or only semi-correlated radio antennae, transmitters and receivers. In the system of the present invention an essential feature is the giving of all required services and information with a minimum number of frequencies and a minimum amount of equipment and antennae on the airplane.

In accordance with our invention, the desired advantage of reduction in the number, weight and complexity of equipments and antennae and the reduction in the number of frequencies required is brought about by means of pulse modulation utilizing pulses of various types and characteristics. In order to combine the advantages of pulse operation with the benefits of conventional continuous wave (C. W.) operation some of the signals may be short pulse modulated carriers of ½ microsecond duration, more or less, which would be handled in accordance with pulse technique, while certain other signals could be much longer, and, in fact, may actually comprise brief signal trains of carrier waves modulated with tone modulations which may be separated by the conventional heterodyning and filtering techniques used for C. W. transmission.

While the use of short duration pulses results in a wider frequency band than ordinary C. W. transmission, if the number of channels required is taken into consideration, as well as the selectivity and frequency stability attainable in practice, the total frequency band required with the new system of our invention is much less than would result from the use of C. W. methods.

Since the control of transmission is effected from the ground at the airport, it is possible to synchronize the various transmissions in such a way that the pulses and short trains of signals corresponding to the various services will be sent in sequence, and to leave in between pulses and signal trains enough time interval to take care of the effects of the different locations of equipments, and the different locations of incoming and outgoing airplanes with respect to the same.

All of the pulses and signalling trains which are radiated from the various transmitters on the ground may be, in accordance with our invention, received by one antenna and one broad band receiver equipped with one or two antennas on each plane. The various types of signals used for different services are separated by pulse separation techniques and by tone separation techniques, such separation being performed after the signals have been received and detected in the common receiver to yield the pulses or trains of tones.

Some transmission must take place from the airplane, for example, to determine the distance of the plane from the ground or from a repeater. In this case, it is not possible readily to synchronize the pulses sent by one plane with respect to the pulses sent by other planes. In the following description an explanation is given of how three sets of pulses may be sent from each airplane, one of these sets uses pulses of, for example, ½ microsecond duration transmitted at sufficiently long intervals so that their transmission times occupy only ½ of one percent of a given time interval. The other two sets of pulses transmitted from the planes are transmitted at still lower rates so as to occupy, for example, less than 1/20 of one per cent of said given time interval, thus the percentage of pulses which overlap each other is small enough to avoid difficulties.

In the case of certain services, e. g. determination in an airplane of its own distance from the ground or from a repeater, it is necessary to distinguish between the reflected or repeated pulses originated by the given airplane and other similar reflected or repeated pulses originated by other airplanes. By using widely spaced pulses and permitting their repetition rates to vary in random manner within certain limits, it is readily possible to recognize the desired received pulses by the fact that their timing corresponds exactly to the timing of the pulses previously transmitted by the given plane.

From the foregoing introductory description and the following detailed description, it will be clear that our invention shows how to handle, at a given airport on a time basis and on one single "ground" frequency, the following services:

1. A number of radio ranges in the same area converging toward the same airport.
2. A number of localizers simultaneously in use at the same airport.
3. A corresponding number of glide paths simultaneously in use at the same airport.
4. A high speed rotary beacon radiating special azimuth signals successively in different directions so as to enable any airplane to determine its azimuth in respect to the center of the airport.
5. Range transmitters or beacons spaced at desired intervals along the airways.
6. A forward scanning radio compass on the plane receiving the signals from any selected one of the localizer or range transmitters on the ground.

Assume, for example, with regard to items 1, 2 and 3 above, that there are four ranges, three localizers and three glide paths in use at once around one airport. Each of these determines an equi-signal path by means of two tone modulated carrier waves substantially as in the existing types of equipment. The two modulation "tones" used for any one of the equipments will be of the order of hundreds of kilocycles, however, instead of ninety and one hundred and fifty cycles (so as to reduce the weight of the receiver filter) and will be different from the "tones" used in the other equipments. Thus, for ten equipments simultaneously in use twenty different modulating "tones" would be used. The radiations, moreover, are intermittent and are timed so as not to overlap, thus avoiding interferences.

With regard to item 4 above, the beacon is generally similar to known types of "omni-directional" beacons, but rotates at high speed so as to give substantially continuous indications. The rotating beam of this beacon is characterized by a null-and-maximum type of pattern essentially similar to an equi-signal pattern but produced by transmitting two kinds of pulses in immediate succession, one kind of pulse being transmitted with a pattern which has a null along the axis of desired reception while the other pulse is transmitted according to a pattern which has a maximum along this axis. Thus, reception of the second type of signal without the first indicates that the airplane in question is aligned with the axis.

One can also transmit on one single "airplane" frequency (preferably higher than the ground frequency) a series of pulses generated on each airplane which will be used as follows:

1. To measure the terrain clearance by measuring the time between the transmission of these pulses and the reception of the same pulses reflected from the earth.
2. To determine the distance of the airplane from the center of the airport and/or from towers along the airway by measuring on each airplane the time interval between the transmitted pulses and the pulses retransmitted from a repeater at the airport or tower, as the case may be. This repeater will receive pulses at the airplane frequency, but will retransmit them at the ground frequency.
3. To show directly the position of the airplane with relation to a map of an airport and surrounding territory by combining the distance indication and azimuth indication above mentioned in a suitable polar coordinate indicator. Such an arrangement provides an accurate control of the flight patterns between the radio ranges and the localizer paths, the desired paths, the desired flight patterns being merely printed on the map upon which the position of the airplane is projected.
4. The same method enables the airplane to determine its distance from the end of the runway on following the localizer, thus replacing the markers now used for this purpose.
5. An anti-collision function is obtained by using a second series of pulses at the same "airplane" frequency together with a form of direction finder giving the approximate directions of any nearby airplanes. The latter transmission is modulated so as to indicate the altitude to nearby airplanes and likewise obtain the altitude indications of the nearby airplanes.
6. By means of a third series of pulses sent out at the same higher frequency from each airplane in reply to the signals from the rotary beacon, a quasi-radar service is provided on the ground which indicates the positions of all airplanes in respect to azimuth and distance more conveniently than is possible with ordinary radar equipment.
7. By modulating and keying this third series of pulses, the altitude and identity of each airplane is continuously indicated on the same screen used for the quasi-radar indications. This automatic reporting thus provides continuously the information which is now obtained at intervals by oral communications from the pilots. Since these indications of altitude and identity are directly shown on the quasi-radar screen, there is no difficulty in associating the altitudes and identities with the positions of the corresponding planes.

In accordance with the present invention, a radio system is provided in which all indications above listed may be given by means of a number of ground equipments employing only two major high frequencies, one for transmitting and one for receiving, and so synchronized that only one main U. H. F. receiver, one auxiliary U. H. F. receiver and one single U. H. F. transmitter is required on the airplane.

The above and other objects and features of our invention and the manner of attaining them are more fully explained in the following detailed description taken in conjunction with the accompanying drawings, in which.

Figures 2, 7:
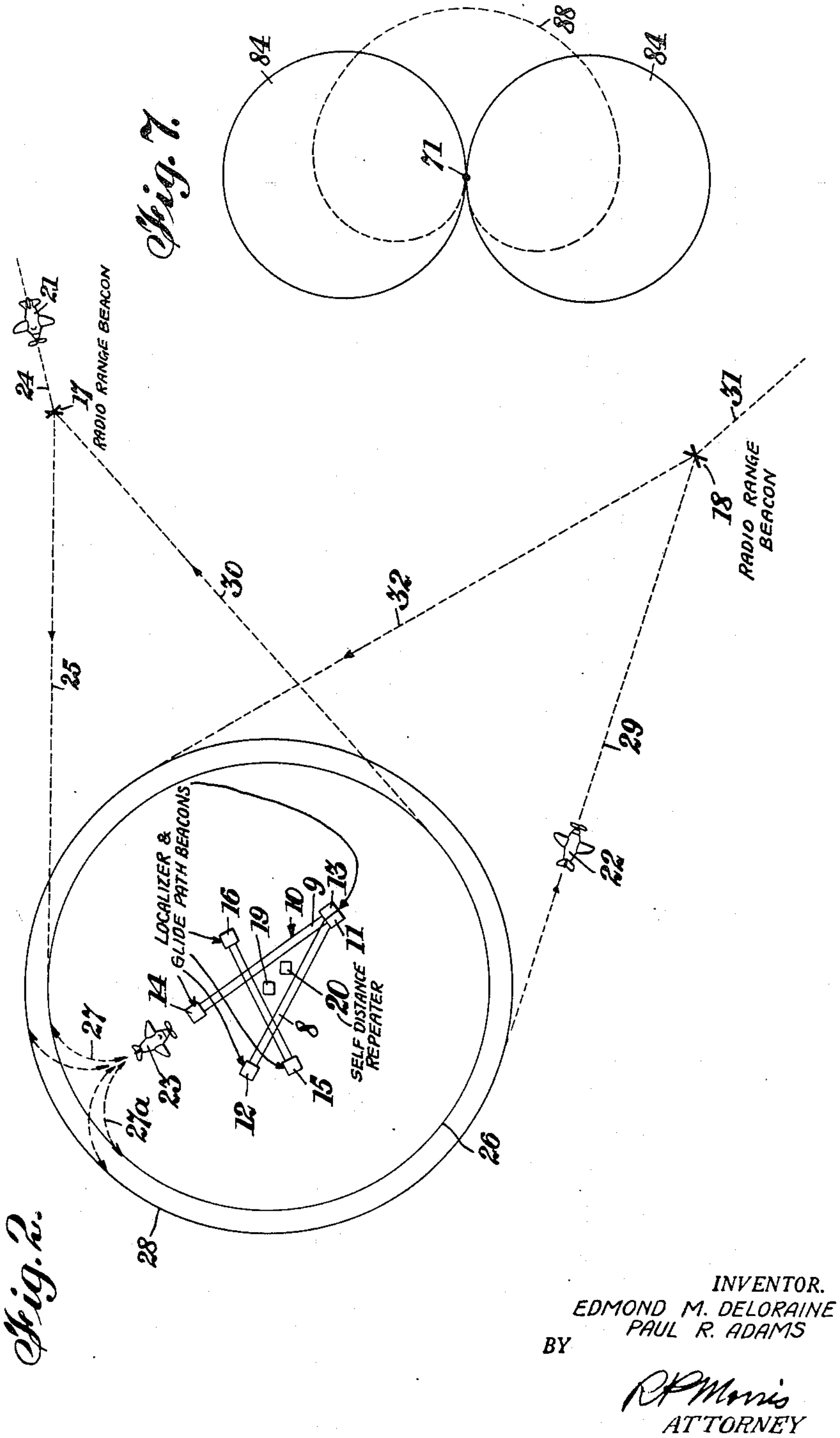
Fig. 2 is a plan view illustrating the general airport and radio range system.
Figure 3:
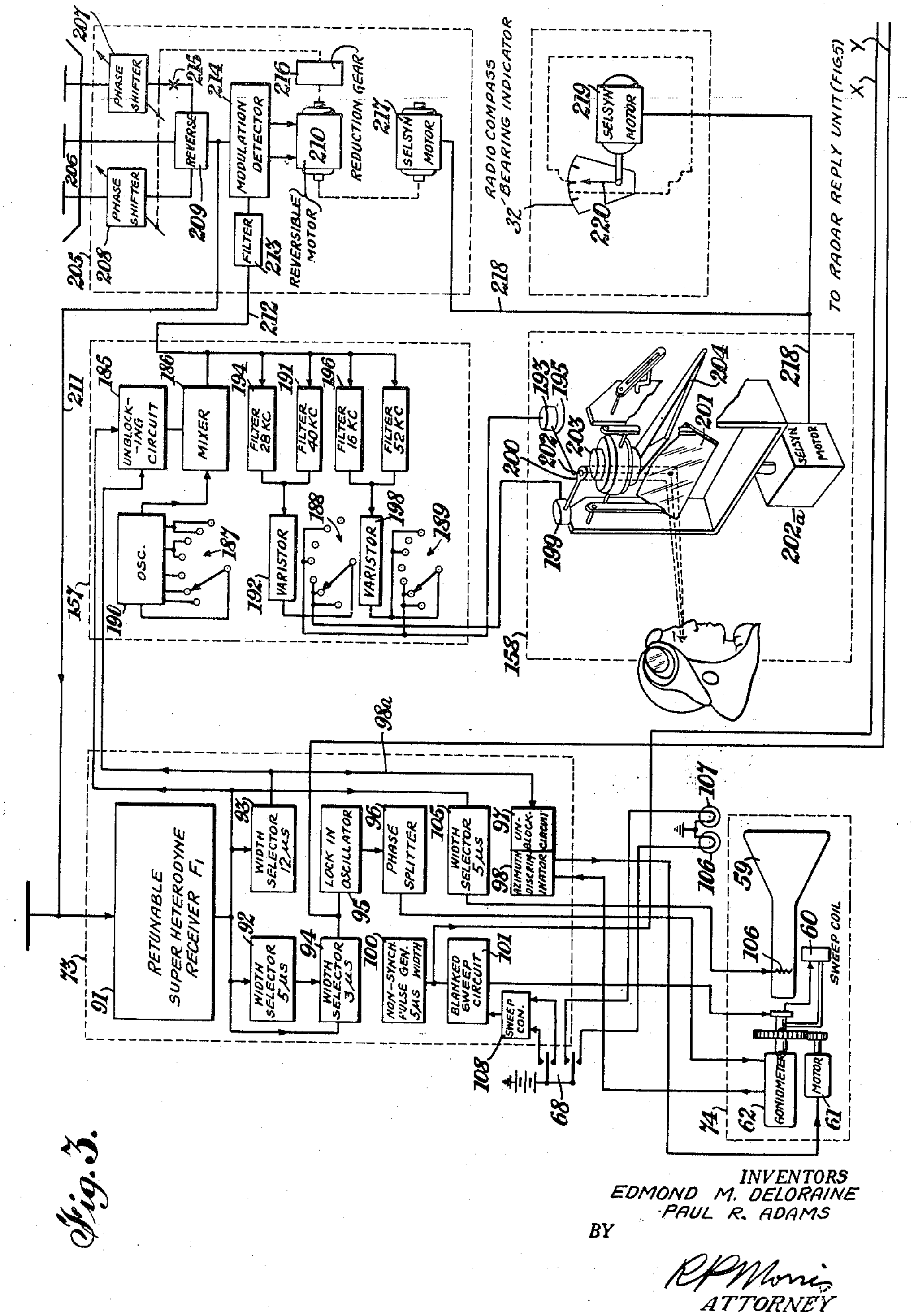
Figure 4:
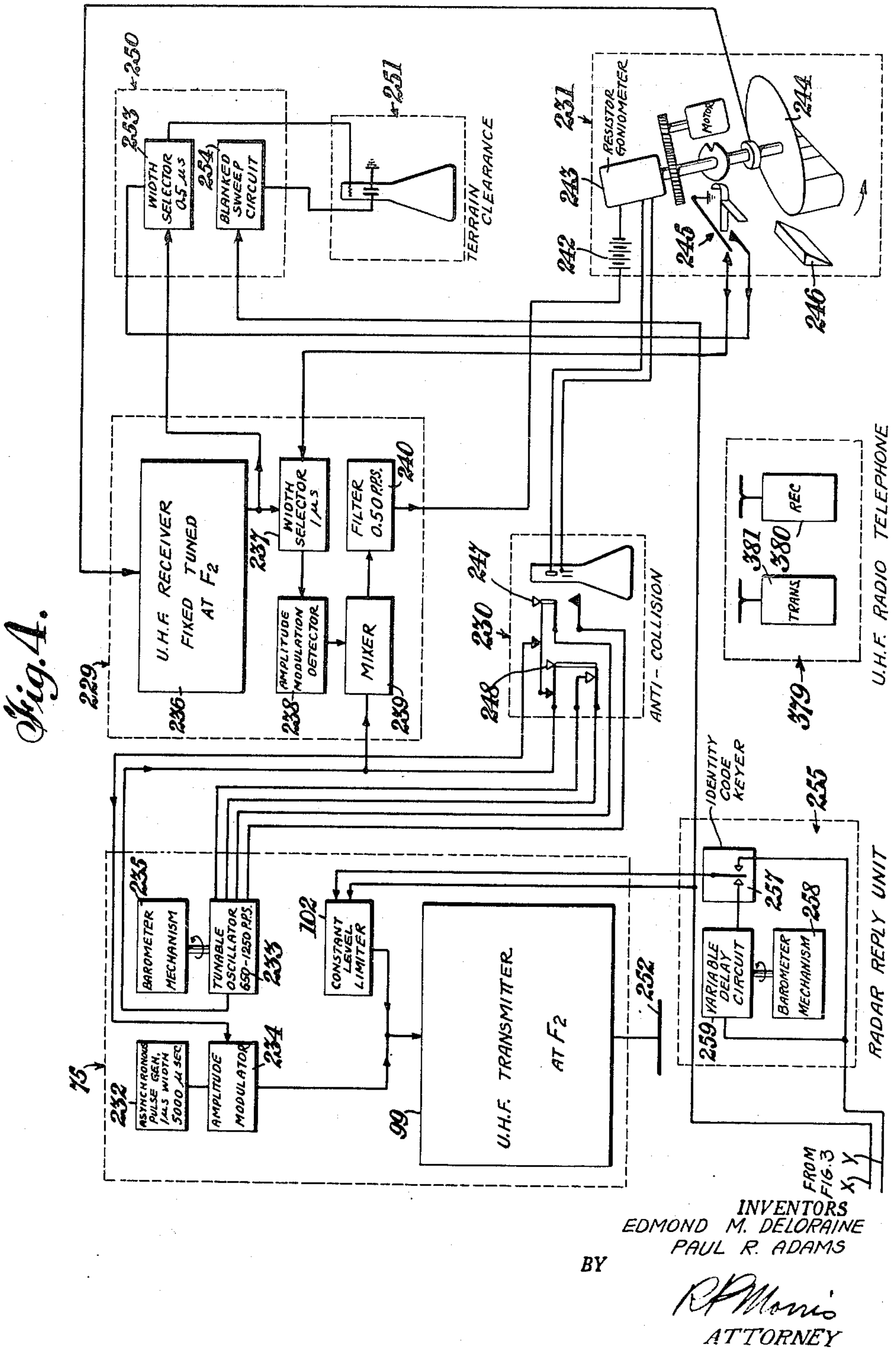
Figure 5:
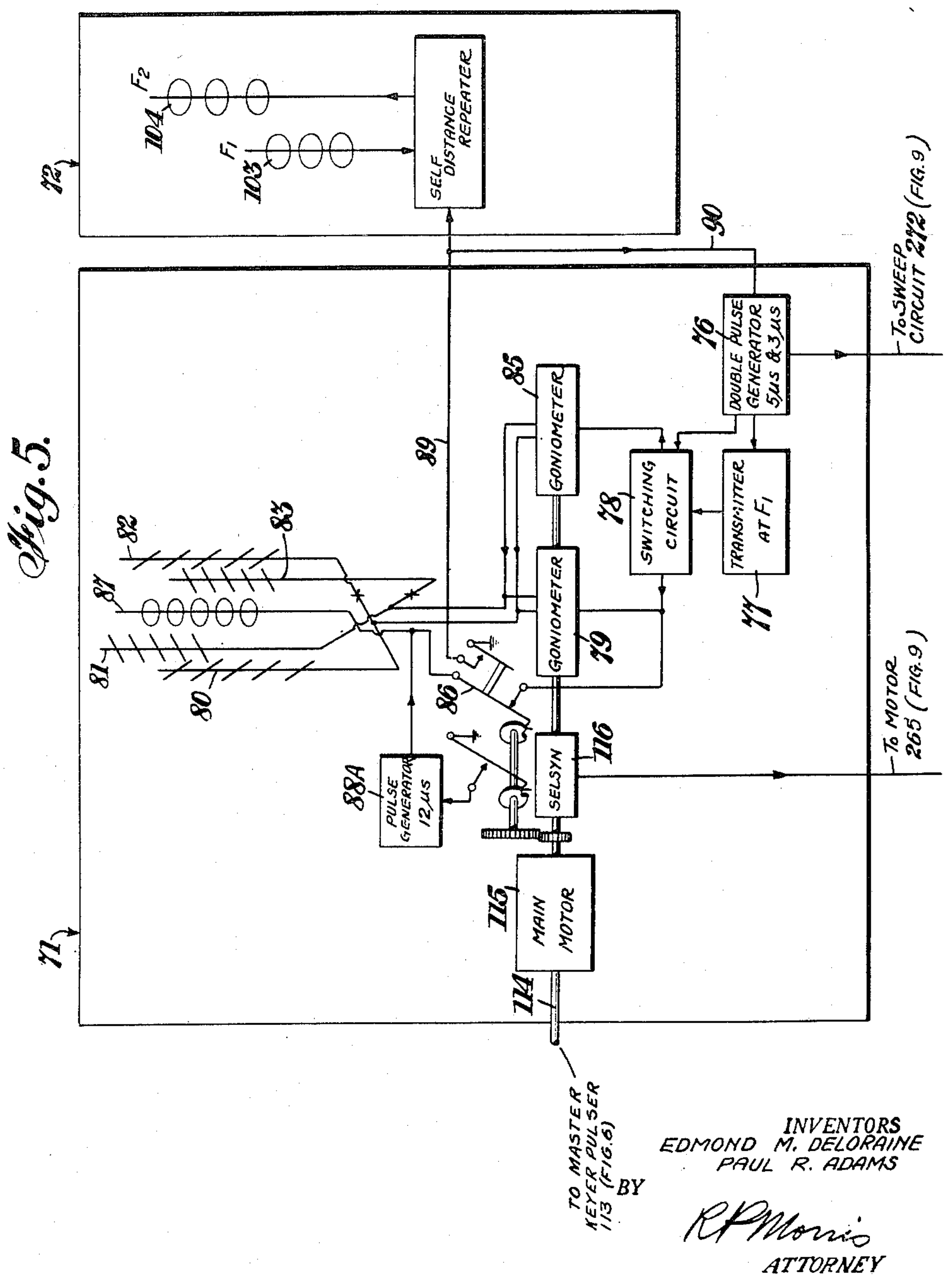
Figure 6:
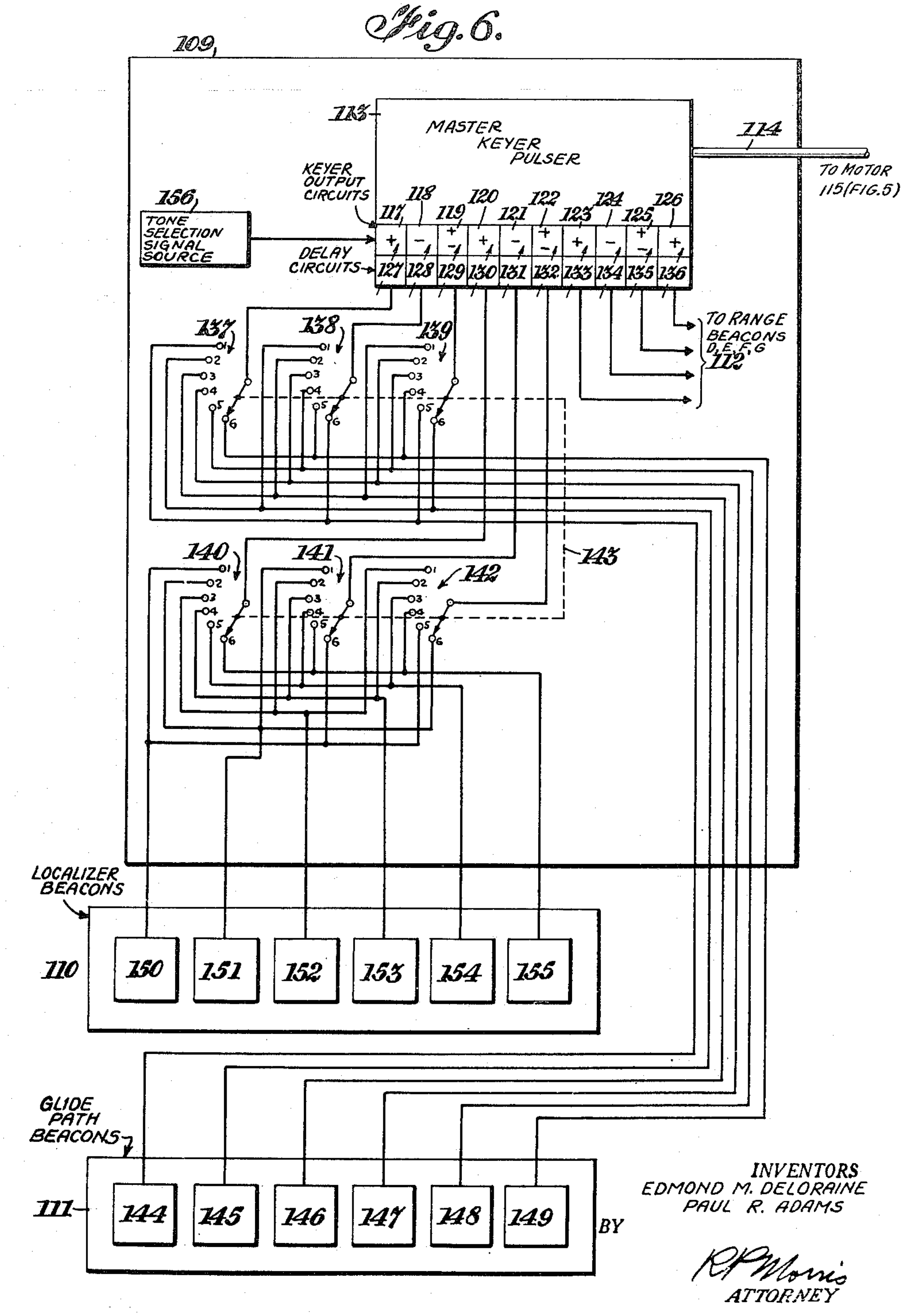
Figure 8:
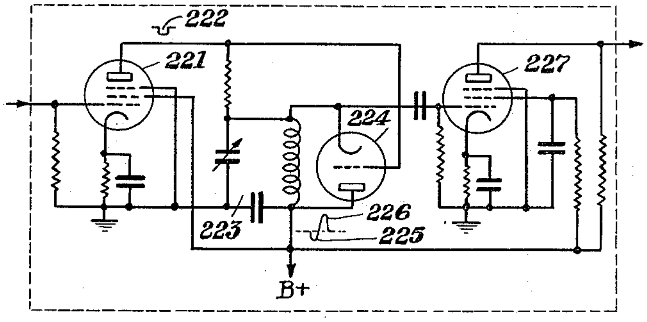
Figure 10:
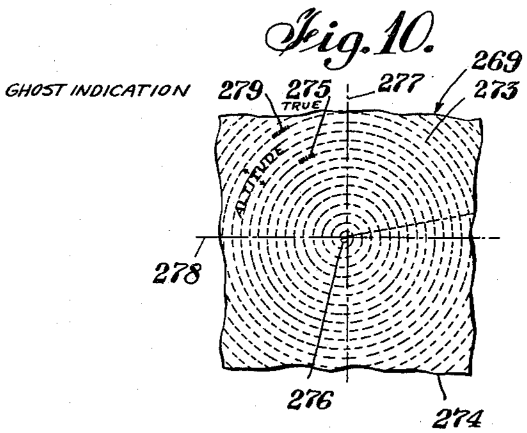
Figure 9:
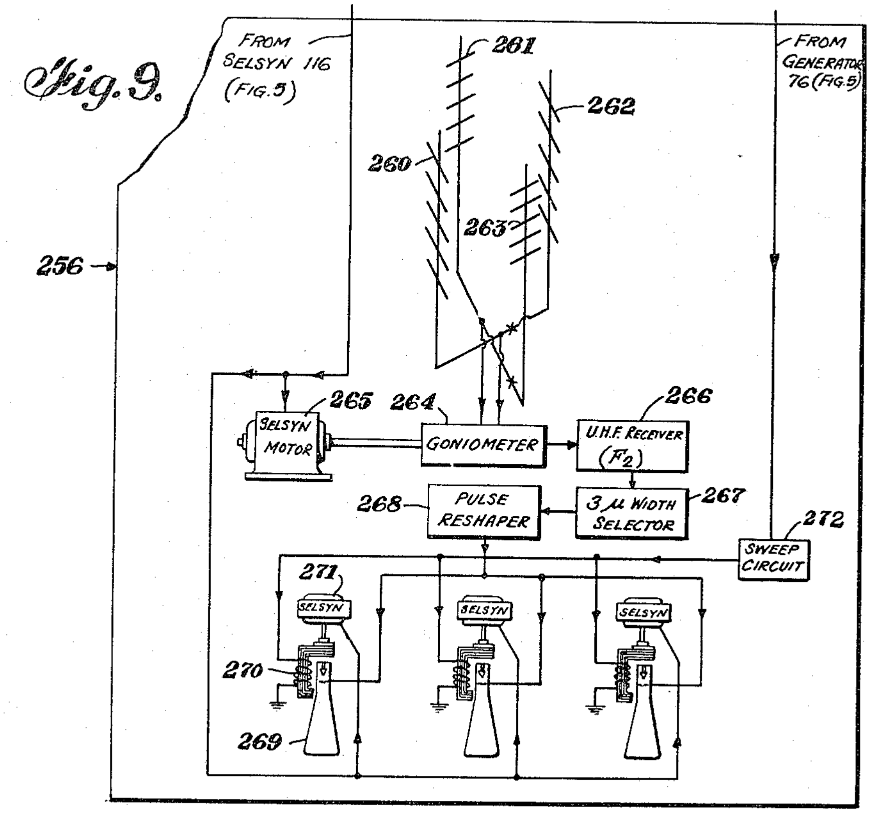
Figure 11:
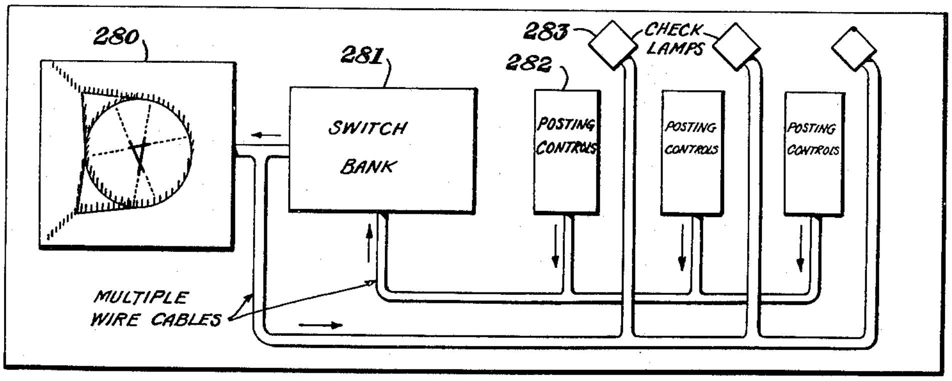
Figure 12:
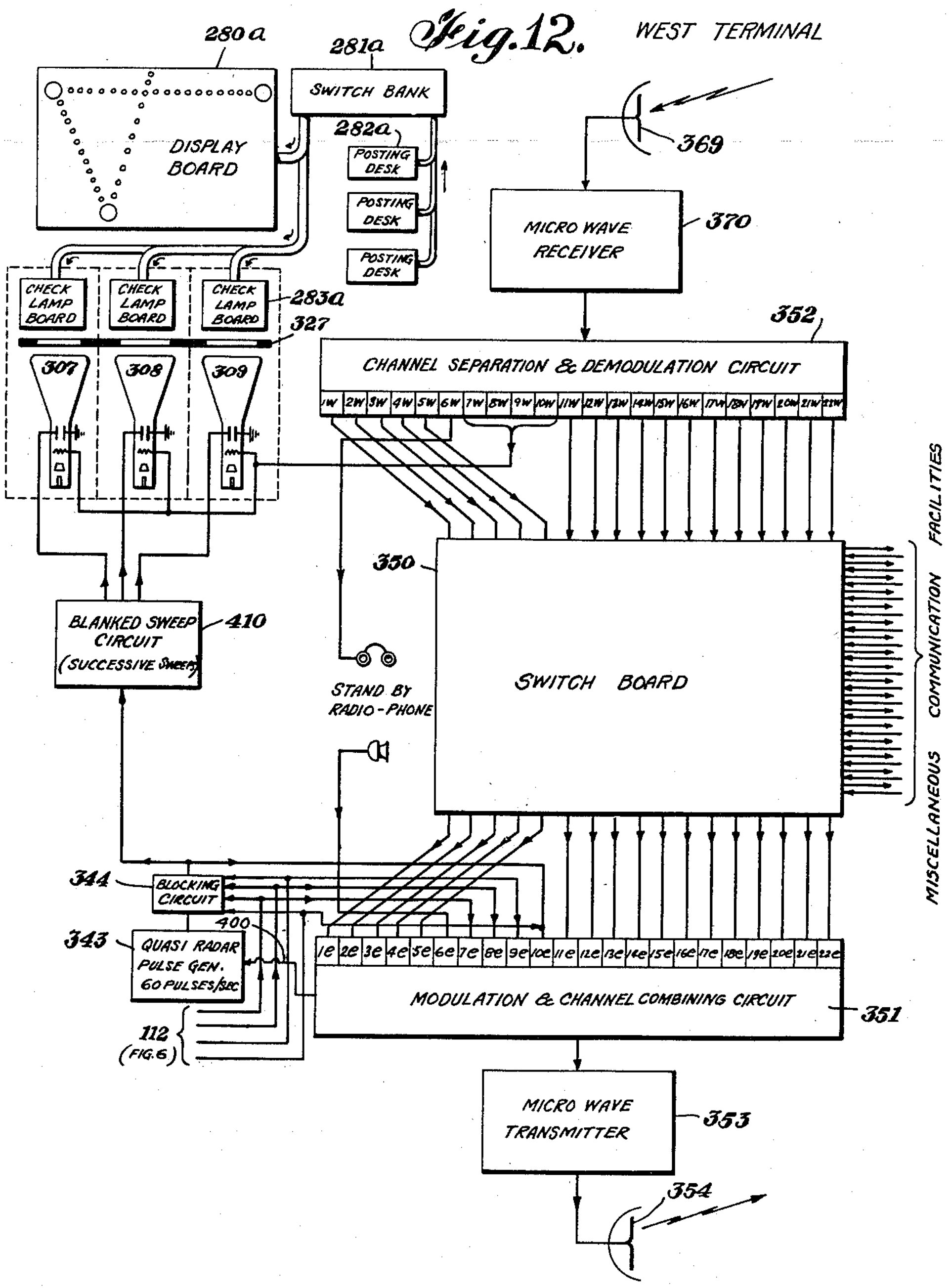
Figure 13:
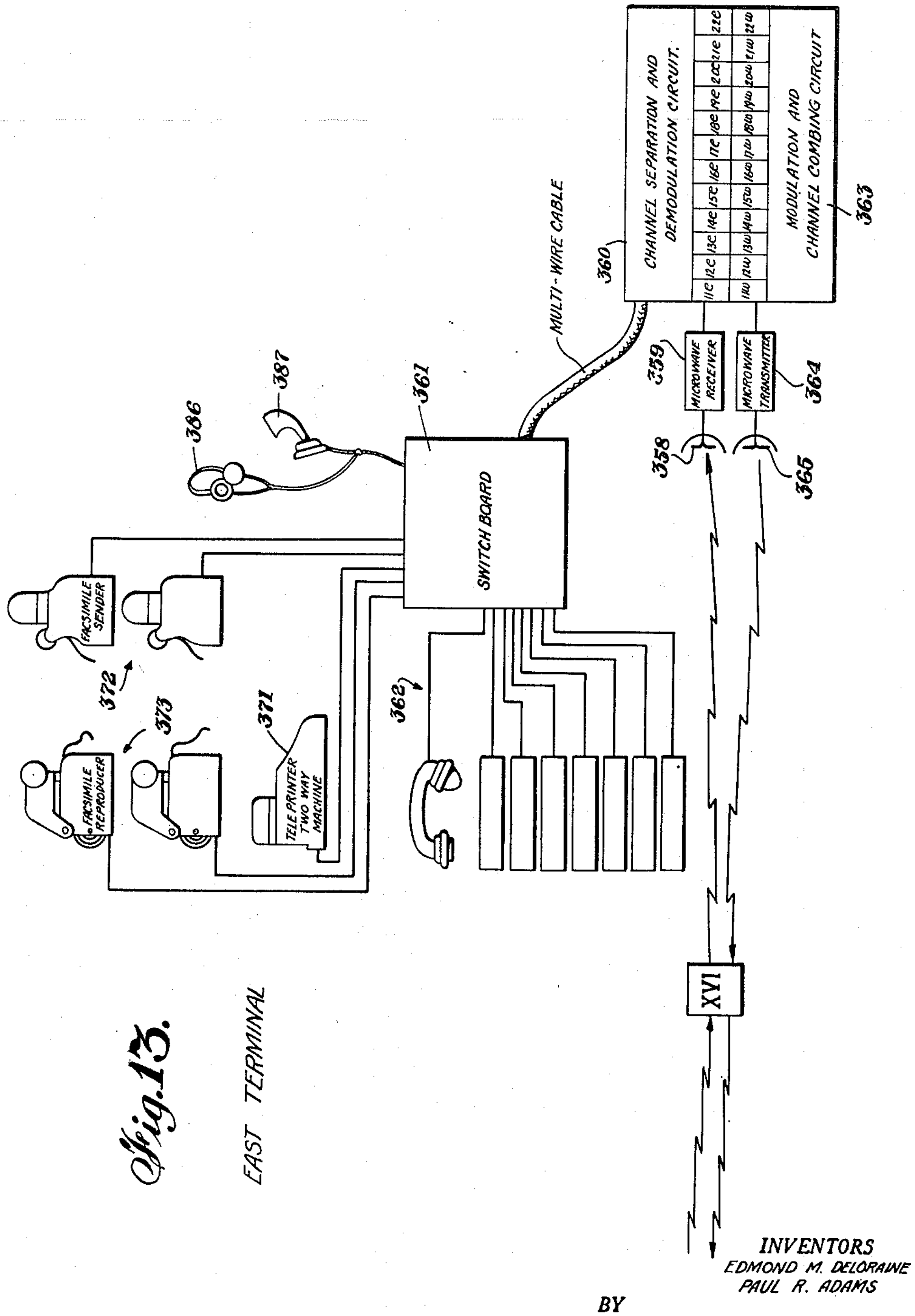
Figure 14:
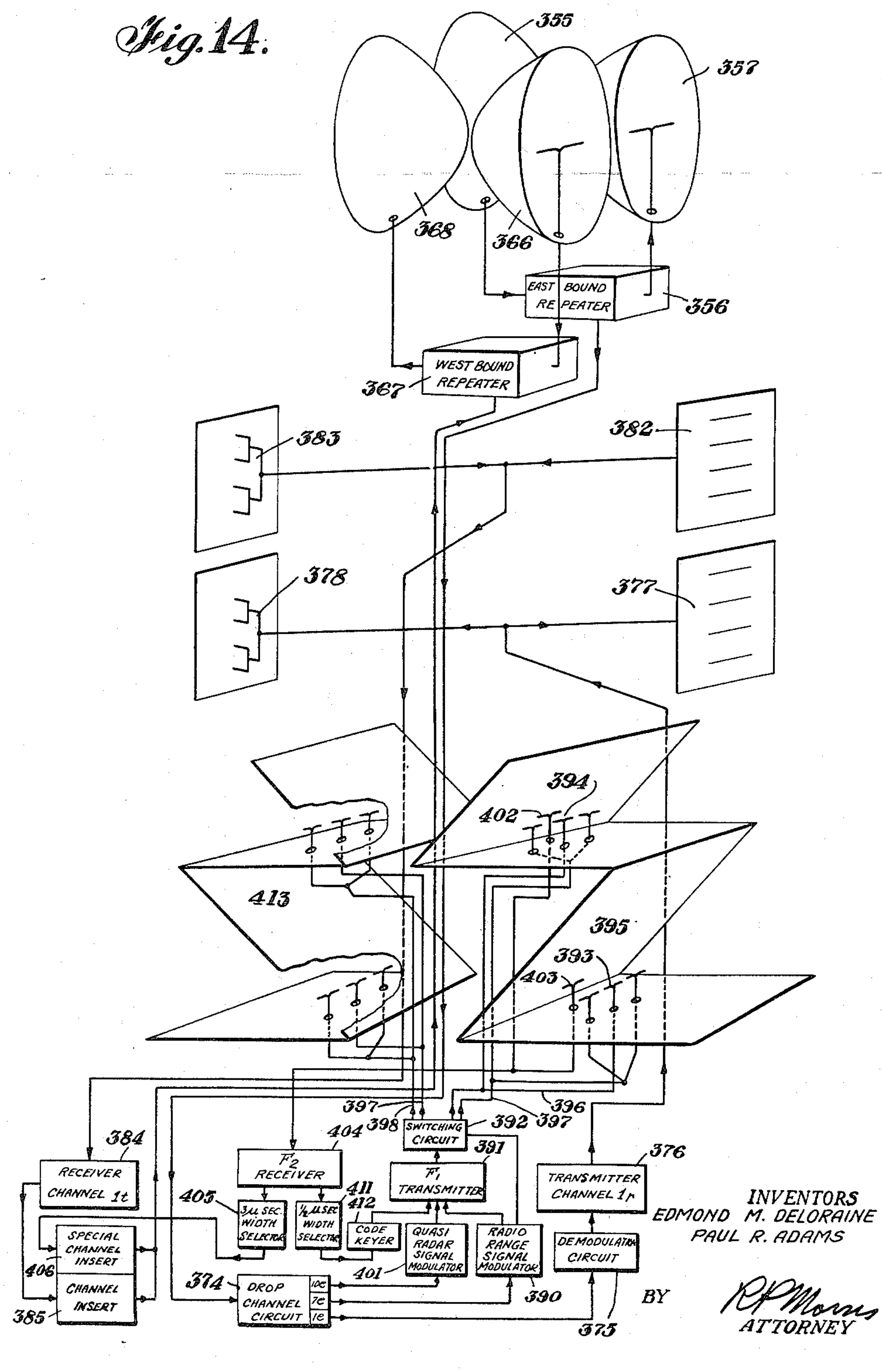

Figs. 3 and 4, taken together, show circuit diagrams of the aircraft equipment for producing various indications;

Figs. 5 and 6, taken together, illustrate the transmitter installation at an airport, Fig. 5 showing the rotary beacon and distance repeater circuits, and Fig. 6 showing localizer and glide path beacon arrangements;

Fig. 7 is a diagram of the field patterns produced in the rotary beacon of Fig. 5;

Fig. 8 is a wiring diagram of a pulse width selector circuit used in the system;

Fig. 9 is a schematic diagram of the quasi-radar indicator at the airport;

Fig. 10 is a view of the sweep pattern of one of the oscilloscopes of Fig. 9;

Fig. 11 is a block diagram of the display and posting desk equipment at the airport;

Fig. 12 is a schematic diagram of the airways terminal equipment showing the quasi-radar equipment for indicating the location of aircraft along the airways;

Fig. 13 is a schematic diagram of the terminal and relay equipment of the system showing in detail the communicating features thereof; and Fig. 14 is a schematic diagram of the relay equipment used on the towers of the airways.

Figures 1, 1A:
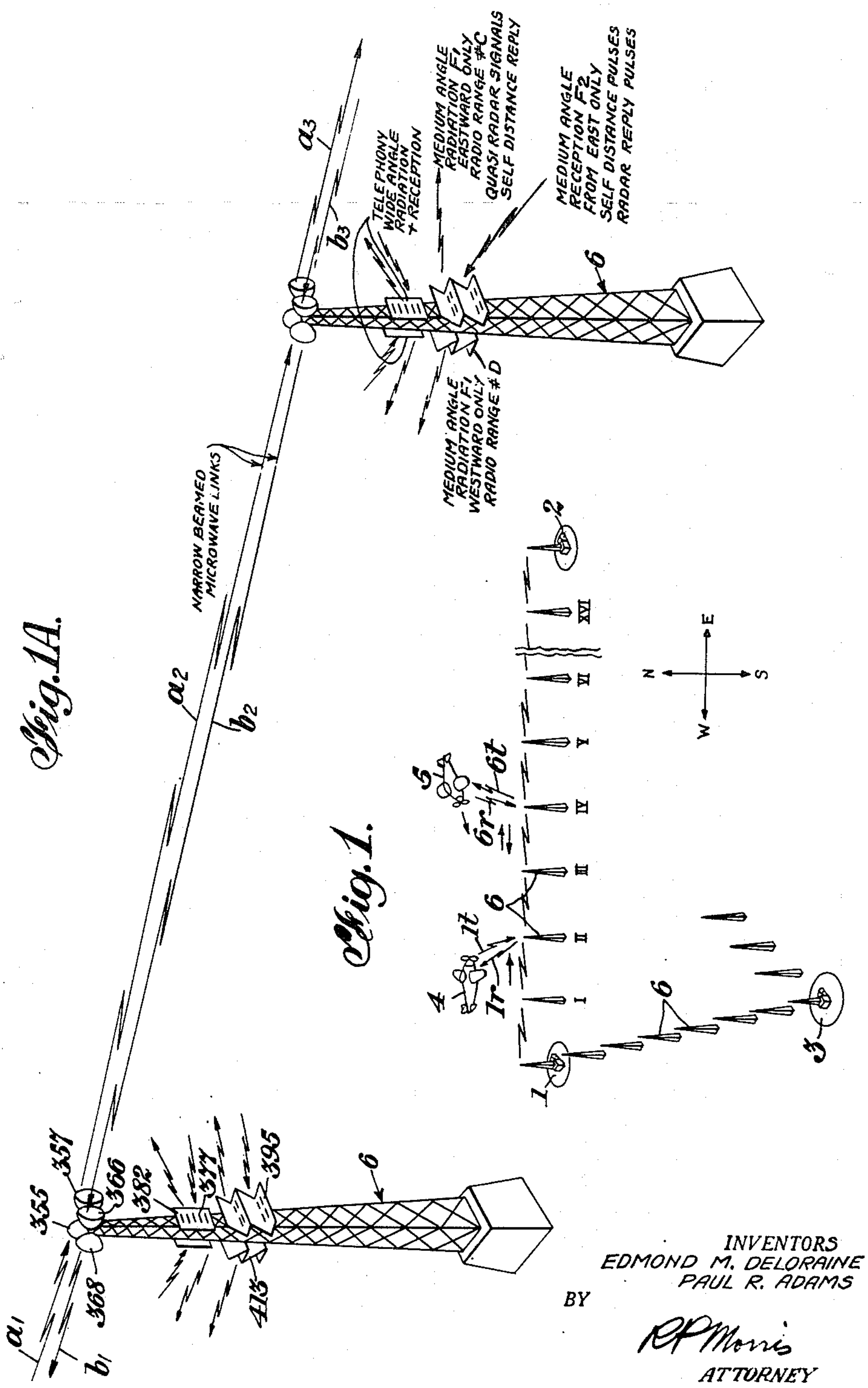
Fig. 1 is a diagrammatic view in perspective of three airports with associated airways.
Fig. 1A is an enlarged view of a part of the airway.

In Fig. 1, there is shown in schematic form the layout of a typical airways system according to the principles of our invention providing communication and quasi-radar facilities between airports 1, 2, 3 and between airports and planes 4 and 5 over intermediate repeater or relay towers 6 which may be spaced along the airway, say, every twenty miles, more or less, depending upon the terrain. Each airport is provided with a multichannel ultra high frequency transmitter adapted to send signals to other airports and to planes in flight by way of the repeater towers 6 (see Figs. 1A and 14) which are equipped with highly directional antennas providing for radiation in specified directions such as east and west, as well as upwards or for general broadcasting in all directions, thus providing facilities for communication as well as range signals.

The planes, in order to properly cooperate with the traffic-control system are provided with transmitting and receiving equipment adapted for ultra high frequency signalling and adapted to indicate their identity and altitude as described in more detail hereinafter.

The functions which must be performed to provide for self-location are the determination on the plane of its own distance from the center of the airport and the determination on the plane of its azimuth angle as seen from the center of the airport. Both these functions require cooperation between equipment on the ground and equipment in the airplane. The following explanation of the principles of operation of the self-location service will be made in conjunction with Fig. 3 representing the self-position, beam reception and transmitter units of the airplane equipment and Figs. 5 and 6 representing the airport equipment.

Turning to Fig. 5, basically 71 is a rotary beacon for sending out signals enabling a plane to determine its azimuth, while 72 is a self-distance repeater designed to receive certain types of pulses at a given frequency, $F_2$ and to re-transmit them at a different frequency $F_1$ for the purpose of enabling the plane to determine its distance from the center of the airport. In the airplane, Fig. 3, the unit 73 is primarily a receiver for receiving the azimuth signals from 71 while 74 is essentially an electromechanical unit for converting the received azimuth signals into mechanical rotation of oscilloscope sweep coil 60.

The nature of these various equipments as well as their principles of operation can best be explained by tracing the progress of a set of azimuth signals through rotary beacon 71 and self-position reception unit 73 to indicator 74, and by then separately tracing the progress of a self-distance pulse from self-position reception unit 73 through transmitter 75 to the self-position repeater 72 as well as the progress of the retransmitted self-distance reply pulse from the repeater 72 through the self-position reception unit 73 to the indicator 74.

The signals sent out from rotary beacon 71, Fig. 5, for determining azimuth are of two kinds: rotary signals and reference signals. The rotary signals consist of a series of pairs of pulses of two different characteristics, for example, of 5 microsecond and 3 microsecond pulse widths transmitted, for example, 4000 times a second with two different directive patterns so chosen as to sharply define an imaginary line hereafter called the sweep line. These diagrams are both rotated a given speed, for example at 12 times a second whereby the sweep line is correspondingly rotated. The reference signals merely consist of pulses of, for example, 12 microseconds width which are sent out uniformly in all directions at the instant when the sweep line is passing through true north. The latter reference pulse is only sent out every alternate time that the sweep line passes through north, so that this reference pulse is transmitted only 6 times per second.

The pairs of pulses of 5 and 3 microseconds width are generated in double pulse generator 76 which is arranged to send out first a 5 microsecond pulse and then immediately thereafter a 3 microsecond pulse, such a pair of pulses being transmitted once every 250 microseconds. Both these pulses are applied to the same transmitter 77, operating at $F_1$, but a switching circuit 78 which is timed by the pulse generator 76 routes the two types of pulses through different channels so that these can be radiated with different directive patterns. The 5 microsecond pulses pass out through the right hand side of switching circuit 78 to goniometer 85 which applies the signals variably to the four antennas 80, 81, 82, 83 with such magnitudes and phases as to produce a figure of eight pattern 84 (see Fig. 7) having one of its null directions aligned with the imaginary sweep line to be defined. The second null which is not desired but is inherent in this type of pattern will be aimed to the rear (i. e., 180° away from the imaginary sweep line). The three microsecond pulses pass out of the left side of switching circuit 78 whence they are transmitted through goniometer 79 to the four antennas 80, 81, 82, 83, and simultaneously through the normally closed cam switch 86 to the central antenna 87. The relative strengths of these signals is such as to produce a cardioid pattern (88 of Fig. 7); and the position of goniometer 79 is shifted 90° with respect to that of 85 so that the maximum of this cardioid will be aligned with the imaginary sweep line while the null of the cardioid is aimed backwards in line with the undesired second null of the figure of eight pattern. By such an arrangement of the patterns, the imaginary sweep line is quite sharply defined since the line will be the only direction in which a plane will receive pulses of 3 microseconds' width without the reception of any pulses of 5 microseconds' width.

The reference pulse of 12 microseconds' width is generated by pulse generator 88A which is triggered for this purpose by a switch geared down from the main motor 115 so as to close 6 times per second when the sweep line is passing through true north. This 12 microsecond pulse is applied only to the omni-directional antenna 87, the switch 86 serving to disconnect this antenna from the other antennas at this instant. The switch 86 also applied a ground to pulse generator 76, over lines 89, 90 at this same instant, so as to temporarily stop the transmission of the 5 and 3 microsecond pulses, during the interval when the 12 microsecond pulse is to be transmitted and for about 12 milliseconds thereafter.

In the airplane equipment shown in Fig. 3, the various azimuth pulses are picked up by the antenna of self-position unit 73 and received by the receiver 91 of this unit. The pulses delivered by the output of this receiver are separated by the width selectors 92, 93, 94.

The output of width selector 92 which passes only the 5 microsecond pulses is applied to bias the width selector 94 so as to block the latter for a given interval, say 25 microseconds. Therefore, the received pulses of 3 microsecond width are not able to pass through width selector 94 except when these are received without any 5 microsecond pulse immediately preceding them. Thus, pulses of 3 microseconds' width will only be delivered from selector 94 in brief groups 12 times a second when the imaginary sweep line of the rotating beacon swings past the airplane under consideration. The pulses thus delivered from 94 synchronize a lock-in oscillator 95 of a given periodicity, for example 12 periods per second; and the output of this oscillator 95 is passed through a phase splitter 96 to the stator coils of goniometer 62, thus producing in this goniometer a magnetic field rotating 12 times per second.

The 12 microsecond reference pulses which are sent out in all directions every second time that the imaginary sweep line passes through true north are similarly picked up by the antenna of reception unit 73, received in the receiver 91, and selected by width selector 93. From this width selector, the pulses pass to an unblocking circuit 97 over line 98a to momentarily unblock the associated discriminator circuit 98.

The rotatable (but normally stationary) search coil of goniometer 62 is continuously connected to the discriminator circuit 98 so that the alternating voltage produced in this search coil by the rotating field above mentioned, is continuously applied to this discriminator circuit. In the normal blocked condition such alternating voltage produces no effect but when the discriminator 98 is unblocked by the arrival of the 12 microsecond reference pulse, the polarity which the alternating voltage has at that instant will control the discriminator circuit so as to cause the latter to send out a positive or negative current for a short time (e. g. $\frac{1}{10}$ of a second). This brief surge of current passes through the motor 61 thus tending to drive this motor clockwise or counterclockwise, with a corresponding rotation of the search coil of goniometer 62.

Assume that the relation between the time of receipt of the reference pulse and the time of receipt of the 3 microsecond pulses (without 5 microsecond pulses) is such that the goniometer search coil has a positive voltage at the instant of unblocking of this discriminator 98. Then at each unblocking of this discriminator circuit, a positive current will pass through motor 61 which will finally cause this motor to turn and rotate the goniometer search coil. This will continue until the goniometer search coil assumes a position such that the voltage which it delivers to the discriminator circuit 98 is zero at the instant of the unblocking of the discriminator circuit.

Thus, the action of the discriminator circuit 98 and motor 61 is such as to rotate the goniometer search coil to a given position dependent upon the time of receipt of the reference pulse with respect to the instant when the imaginary sweep line of rotary beacon swings past the airplanes. This will mean that the goniometer search coil will always assume a position corresponding to the azimuth angle of the airplane as seen from the rotary beacon 71.

In addition to the azimuth angle, it is also necessary to obtain an indication of the airplane's distance from the center of the airport, in order that the complete position of the airplane can be shown on a map of the airport. Such an indication is obtained by triggering transmitter 99 by pulses from pulse generator 100 to cause it to transmit at its carrier frequency of $F_2$ a self-distance pulse of a given character, for example, of ½ microsecond width to the self-distance repeater 72 at the airport (Fig. 5). The self-distance repeater then re-transmits a corresponding self-distance reply pulse also of ½ microsecond width but on a different carrier of $F_1$ frequency. The self-distance reply pulse is then received in 91; and the distance of the airplane from the ground is determined by using this reply pulse to illuminate a spot on the screen of self-position oscilloscope 59 whose deflection plates are fed from a sweep circuit 101 synchronized with the transmission of the outgoing self-distance pulse from generator 100.

Considering these operations in greater detail, the self-distance pulse originates in non-synchronous generator 100 which generates a pulse of ½ microsecond width approximately 30 times per second. The pulses from 100 are applied through limiter 102 in the transmitter unit 75 to the $F_2$ transmitter 99 which thereupon radiates a corresponding half microsecond pulse of $F_2$ carrier to the self-distance repeater 72 at the airport. This self-distance repeater receives the self-distance pulses on antenna 103 and retransmits a pulse of the same width but on a different carrier frequency $F_1$ from antenna 104, this pulse being referred to as a self-distance reply pulse.

The reply pulse from repeater 72 is picked up by the antenna of self-position reception unit 73, received in receiver 91 and selected by width selector 105. From the output of 105 the pulse is applied to a control grid 106 of oscilloscope 59 in the self-position oscilloscope unit 74. At the instant when the pulse was applied from the pulse generator 100 to the transmitter unit 75, this same pulse was also applied to blanked sweep circuit 101 to initiate the sweeping action of this circuit. The sawtooth sweep voltage thus produced is applied to sweep coil 60 which magnetically controls the beam deflection of oscilloscope 59. Accordingly, when the self-distance reply pulse is applied to the grid of this tube, as previously described the visible spot thus produced has a radial deflection corresponding to the time interval between the sending of the self-distance pulse and the reception of the self-distance reply pulse. Thus, the radial deflection of this spot measured from the center of the oscilloscope accurately represents the distance of the airplane from the center of the airport.

The direction in which the spot is radially deflected outward from the center of the circle, depends upon the rotary position of the sweep coil 60. This coil, however, is supported by the shaft of the goniometer 62 so that its position corresponds to the position of the search coil of this goniometer. As was previously explained in connection with the description of the transmission and reception of azimuth signals, the search coil of this goniometer 62 is controlled so as to constantly assume a position corresponding to the azimuth angle of the airplane as seen from the beacon 71 at the center of the airport. Thus, the luminous spot appearing on the screen of the oscilloscope 59 will have a position which corresponds both in distance and azimuth to the position of the airplane with respect to the center of the airport.

LANDING BEACONS AND RANGE SERVICE

The functions to be performed in order to render the landing beam and range service are essentially the functions generally performed separately by a number of glide paths, localizers and ranges on the ground cooperating with separate glide path receivers, localizer receivers and range receivers in the air. In accordance with the present invention, all these services are rendered simultaneously on one single carrier frequency which is also the same frequency used for the self-location services.

These functions will now be described in connection with Figs. 3 and 6. The usual 90 and 150 tone frequencies may be replaced by high frequency "tones" of the order of hundreds of kilocycles and these different frequencies or "tones" are used for the different glide path and localizer equipments. As an example, a system having the runway A, B and C and four range beacons called D. E, F and G may be considered. Twenty such "tones" are, therefore, required, the lowest four tones being used for the "A" glide path and localizer combination, the next four for the "B" glide path and localizer combination and the third group of four for the "C" combination of glide path and localizer. The last eight tone frequencies are allotted in pairs to the ranges D, E, F and G.

A suitable set of twenty tones is as follows:

718 and 650 kc. for "A" glide path
838 and 770 kc. for "B" glide path
958 and 890 kc. for "C" glide path
742 and 674 kc. for "A" localizer
862 and 794 kc. for "B" localizer
982 and 914 kc. for "C" localizer
1078 and 1010 kc. for "D" range
1102 and 1034 kc. for "E" range
1198 and 1130 kc. for "F" range
1222 and 1154 kc. for "G" range It will be noted the above listed frequencies have been selected according to a systematic plan so that the lowest four frequencies, when mixed with a heterodyning oscillation of 702 kc. and then demodulated will yield beat frequencies of 16, 28 40 and 52 kc. respectively. The next four tone frequencies, when mixed with a heterodyning oscillations of 822 kc. and then demodulated will also yield the same values of beat frequencies (16, 28, 40 and 52 kc.) while the third group of four tones when heterodyned with 942 kc., or the fourth group of four tones when heterodyned with 1062 kc., or the fifth group of four tones when heterodyned with 1182 kc. will also yield the same four beat frequencies. This relationship between the tone frequencies simplifies the design of the receiver which need only have four fixed filters for passing 15, 28, 40 and 52 kc. respectively, and five crystals for providing heterodyning frequencies of 702, 822, 942, 1062 and 1182 kc.

In order to still further reduce the possibility of interference between the various glide path, localizer and range transmitters, the several transmissions from these transmitters take place intermittently at a rapid rate, for example, six times per second, and definite time intervals are assigned to each transmission so that no two transmissions will take place simultaneously. Also, each transmitter sends its own two transmissions successively. In other words, in the case of a glide path transmitter, the "fly up" and "fly down" signals are successively transmitted, similarly in the case of a localizer or range the "fly left" and "fly right" signals are successively transmitted. Accordingly, ten different pairs of time intervals are required for the simultaneous operation of three glide paths, three localizers and four ranges.

In order to carry out the above mentioned two principles of timing the transmissions of the different glide paths and localizers so as to occur successively and adjusting their modulation frequencies so as to be different from one another, the ground equipment required for the landing beam and range service includes not only the glide path, localizer and range transmitters themselves, but also a central "landing beam control equipment" which is shown in Fig. 6.

Fig. 6 shows essentially control equipment 109, together with a number of localizers 110 and a number of glide path beacons 111. A number of range beacons are also provided connected to leads 112 but are not shown and need not be considered in detail since they may be of any conventional form.

If more runways are provided a correspondingly greater number of beacons may be needed as will be clear.

The landing beam control equipment 109 (Fig. 6) comprises a master keyer 113 mechanically driven by shaft 114. the main motor 115 (Fig. 5) which serves to drive goniometers 79, and 85, Selsyn 116 and switches 86 and 89 in the rotary beacon system. This keyer may be of any conventional construction wholly mechanical or partially mechanical and partially electronic, and is arranged to produce six groups of synchronizing impulses per second, each such group being sent out during the 12 microsecond interval when the transmission of the 5 and 3 microsecond pulses normally sent out by the rotary beacon 71 is temporarily silenced by switch 86 of such beacon. Each of these groups of synchronizing impulses produced by the keyer 113 consists of 10 triggering impulses of any convenient length transmitted successively one microsecond apart over the 10 separate output circuits 117, 118, 119, 120, 121, 122, 123, 124, 125, 126. Each of these 10 output circuits is preferably provided with a corresponding delay adjustment by means of circuit 127—136 so that the relative timing of the synchronizing pulses received over these 10 outputs can be accurately adjusted.

The last four of the 10 output circuits are used for synchronizing the range transmissions which are located away from the airport and the corresponding outputs 123, 124, 125, 126 of 113 are, therefore, connected to the airways terminal equipment over lines 112. The first six sets of synchronizing pulses in each group are used to synchronize the transmissions of 3 of the localizers and 3 of the glide paths.

In the simple three runway system only one glide path and one localizer beacon would normally be operative. At a larger airport more runways may be available for simultaneous use. It is considered, however, that not more than 3 glide paths and 3 localizers will be operated at any one time. The selection of which 3 localizers and glide paths are to be used at any given time will be principally governed by the direction or velocity of the wind which may change within a comparatively short interval. It is desirable to provide for changing selection of these beacons quickly and conveniently. Accordingly, a group of 6 switches 137–142 is provided, which are ganged to be operated by one single manual control 143, and the connections from the first 6 output circuits 127, 128, 129, 130, 131, 132 of master keyer 113 to the selected 3 glide path beacons and 3 localizer beacons are controlled by these switches. The six glide path beacons are designated by 144–149 respectively and the six localizers by 150–155 respectively.

If the ganged switches 137–142 were set to their first position with their wipers resting on their number 1 contacts, the first 3 output circuits 117, 118, 119 will be routed to glide paths 144, 145 and 146 respectively, while the next 3 outputs 120, 121 and 122 will be routed to localizers 150, 151 and 152. Thus, localizer 150 and glide path 144 will be made effective to define a first landing beam; localizer 151 and glide path 145, would be effective for a second landing beam: and localizer 152 and glide path 146 will be effective for a third beam. Similarly, if the switches were set to their second position the first beam will be defined by localizer 151 and glide path 145, the second beam by localizer 152 and glide path 146, and the third beam by localizer 153 and glide path 147. In corresponding manner, other switch positions will render other combinations of glide path and localizer beams effective.

In order to render a given glide path or localizer effective for defining a certain beam, such glide path or localizer must not only receive the appropriate synchronizing signal from master keyer 113 so as to cause it to perform its transmissions during the two appropriate intervals allocated to that beam, but must also receive an additional controlling signal to cause it to employ the appropriate modulation "tones" allocated to that beam. Thus, a localizer which is to operate on the third beam must not only receive a synchronizing pulse from output 122 which defines the time for localizer transmissions from the third beam but must also be controlled to employ modulation "tones" of 914 and 982 kc. which are the tones allocated for localizer transmission on this beam. (See the table of tone frequencies given above.)

The control necessary to cause the selection of the appropriate tone frequencies in the several localizer and glide path equipments may consist of three distinctive signals of any type (e. g. +D. C., −D. C. and 60 cycles A. C.). These three characteristic frequencies may be directly superposed on the synchronizing pulses being thus controlled through the same switches 137–142 which control these impulses. Accordingly, it may be assumed that tone selector signal source 156 applies to outputs 117 and 120 of master keyer 113, a positive D. C. superposed upon the previously mentioned synchronizing pulses, while outputs 118 and 121 have negative D. C. and outputs 119 and 121 have low frequency alternating current superposed upon their synchronizing pulses. These combined pulses operate at the glide path and localizer systems to select the desired combinations of "tone" frequencies in any convenient known manner.

Up to this point only the landing beam control equipment has been considered in detail. It is believed that no similar detailed description of the glide path or localizer transmitters themselves nor of the receiving and displaying equipments on the airplane is necessary.

Just prior to the reception of the various "fly left" and "fly right" signals in the three operative localizers and of the corresponding "fly up" and "fly down" signals of the three glide paths, the airplane will receive a 12 microsecond pulse of $F_1$ carrier frequency from the rotary beacon 71 as previously explained in the description of the self-location service. Such signal in addition to being applied to unblocking circuit 97 as previously described, is simultaneously applied to unblocking circuit 185 of beam reception unit 157, thus preparing the unit 157 for the subsequent reception of the various "fly down," "fly left," "fly right" signals.

When the "fly left" signal arrives from localizer 150 which is assumed to be conditioned for defining the "B" beam, as above described, this signal will be received in receiver 91 thus yielding a rounded train of 862 kc. waves. Such train of waves will be applied not only to the width selectors 92, 93, 94 (which will not respond to this signal) but also through unblocking circuit 185 to the mixer 186 of unit 157. Assuming that switches 187, 188, 189 have been set to their second position as shown, so as to condition this beam reception unit B for receiving the signals of the B beam, the oscillator 190 will be generating a frequency of 822 kc. which will be constantly applied to the mixer 186. The 862 kc. tone from the "fly left" signal when mixed with this 822 kc. heterodyning wave will yield in the output of mixer 186 a 40 kc. beat note which will pass through the filter 191 to varistor 192. This varistor 192 will rectify the signal to produce a positive current which will pass through switch 188 in its second position to the meter movement 193 of display unit 158.

When the immediately succeeding "fly right" signal arrives at the airplane, it is similarly received in receiver 91 to yield a 794 kc. tone which is applied through unblocked circuit 185 to the mixer 186 as before. Such 794 kc. tone when heterodyned with the 822 kc. output from 190 will yield a beat note of 28 kc. which will pass through the filter 194 to the varistor 192. The polarity of the connections from 194 to 192 should be such that the current produced by rectification of 192 will be negative. This negative current will again be applied through switch 188 in its second position to the meter movement 193 of display unit 158.

Assuming that the plane is exactly on course so that the "fly right" and "fly left" signals are received with equal amplitudes, the positive and negative currents which will be applied to the meter movement 193, as above explained, will be of the same magnitude and, therefore, no deflection will be produced. If, however, the plane is to the left of the course, the "fly right" signal will be predominantly received so that the negative current will exceed the positive current, thus resulting in a deflection of the pointer 195 of 193. If the plane is to the right of the course the pointer will be deflected in similar manner but in the opposite direction.

Immediately before the receipt of the two signals above traced—i. e. the "fly left" and the "fly right" signals from the localizer used for the "B" beam, the plane will receive a corresponding pair of "fly up" and "fly down" signals from the glide path used for the "B" beam. In the case assumed, where localizer 150 is used for the "B" beam, the glide path used for this same beam would be glide path 144.

The description of the reception of localizer signals may be considered as applicable also to the glide path, since all glide path and localizer equipments may be essentially identical. In fact, the only difference between the glide paths and localizers is a difference in the antenna arrays employed and a difference in the frequencies of the transformers, and of the three modulating frequencies.

The localizer signals will control meter movement 193 of display unit 158, Fig. 3, while the glide path signals will correspondingly control meter movement 199 of this unit. Meter movement 199 carries a luminous ring 200 which is deflected back and forth (so that its image as seen in inclined mirror 201 seems to move upward or downward) under control of the glide path signals. Meter movement 193 carries a luminous spot 202 normally positioned centrally behind the luminous ring 200 but capable of moving right or left under control of the localizer. The relative positions of the spot and ring are thus controlled by the landing beam signals to produce the several different types of indication.

The inclined mirror 201 is controlled by Selsyn motor 202 (which is actuated from the radio compass unit) and by a gyroscope 203, having its axis of rotation vertical. Accordingly, the mirror will be tilted vertically by the gyro in response to a vertical tilting of the plane and will be tilted left or right by the radio compass when the plane turns right or left. The luminous spot and ring carried by the meter movements 193 and 199 will, therefore, appear to shift with respect to the viewing frame in the desired manner.

The horizon bar 204 is tilted by sideways tilts of the gyro 203 to show the angle of bank. This bar is placed behind the mirror 201 at the position of the virtual image of the spot and the mirror is sufficiently transparent so that this bar can be seen.

RADIO COMPASS FEATURE

The radio compass function required consists of continuously finding and indicating the direction of a particular localizer or range transmitter. The direction of such transmitter relative to the axis of the plane is called the "relative bearing" of the transmitter. This information is preferably displayed on the display unit 158, the information being given in this case in the form of a sideways displacement of the whole ring-and-spot pattern of the indicator.

For performing this function, no special equipment is required on the ground since the normal localizer or range signals are made use of. The airplane equipment for performing the radio compass function consists of a forward scanning radio compass unit 205 with a suitable antenna array 206 fixed on a forward portion of the airplane, and a bearing indicator 32 (see Fig. 3). The self-position reception unit 73 and the beam reception unit 157 which have already been described as used for other functions are also employed for the radio compass function.

The radio compass unit 205, Fig. 3, essentially includes a pattern shifting means 207, 208, an electronic reverser 209, a rotary mechanism motor 210 and a modulation detection circuit. The energy received on antenna array 206, after passing through phase shifters 207, 208 and electronic reverser 209 is applied over line 211 to the input of receiver 91. This energy is applied over unblocking circuit 185, mixer 186 and filter 213 to a modulation detector 214. Filter 213 is tuned to pass the beat frequency corresponding to the localizer signal. This energy will carry a modulation dependent upon the antenna switching action in antenna array 206. Modulation detector 214 detects only this modulation produced by the reversing switching of electronic reverser 209. When array 206 is aligned with the localizer transmitter, the two outer antennas which are coupled in phase opposition due to transposition 215 will have no effect. The electronic reverser 209 serves alternately to connect the central antenna of the array 206 with one, and the other the two outer antennas, thus producing a modulation effect whenever the outer antennas are not arranged for null reception. This modulation effect, detected in 214, serves to control reversible motor 210 in accordance with the phase of departure of the null reception with respect to the center antenna.

If the antenna is not aligned with the localizer beacon, the incoming signals applied to modulation detector 214 over filter 213 will produce a resultant current which will drive motor 210 in one direction. The shaft of motor 210 is coupled over reduction gearing 216 to phase shifters 207 and 208. These phase shifters are arranged to adjust the phase of the two outer antennas so that the null of the two outer antenna units will be readjusted into alignment with the transmitting beacon. Accordingly, these antennas will again be quickly aligned to null position.

Also coupled to the shaft of motor 210 is a Selsyn generator 217. Selsyn generator 217 is connected by line 218 with Selsyn motor 202*a* to control the position of mirror 201. Selsyn generator 217 is also further connected to a second Selsyn motor 219 which controls pointer 220 on bearing indicator 32.

PULSE WIDTH SELECTOR

The pulse width selectors, shown in the various parts of the system, may be of any desirable type. These width selectors serve to select pulses of any particular width to the exclusion of other pulses. In Fig. 8 is illustrated a simple form of width selector described in detail in the copending application of E. Labin and D. D. Grieg, Serial No. 487,072, filed May 15, 1943, now Patent No. 2,440,278 issued April 27, 1948.

The pulses are applied to a tube 221 and produce in the output thereof negative pulses shown at 222. These negative pulses are applied to shock excite tuned circuit 223 which is tuned to a frequency of which the pulse width represents one-half a wavelength. The pulses are simultaneously applied to the grid of damping tube 224 connected across tuned circuit 223. The pulses applied to circuit 223 will produce a wave having a negative portion, as shown at 225, and a positive portion at 226. The oscillations produced in circuit 223 will tend to go negative after portion 226 has been produced. However, damping tube 224 will short-circuit any further negative portion since, at this time, the negative pulse 222 no longer is present on the grid of tube 224. As a consequence, only the portions 225 and 226 are produced.

If pulses of different widths, either smaller or larger, are applied to the input circuit, these pulses will produce portions 226 having lower peak amplitudes since they are not related to the one-half wavelength period as are those of the wanted pulses. Accordingly, the wanted pulses will produce the higher peak values. These higher peak portions 226 from the output of circuit 223 are then threshold clipped by clipper amplifier 227. This tube is biased to such a value that the portions 226 of lower amplitude will not pass. The peak portions passed correspond only to the received pulses of the desired width.

ANTI-COLLISION FEATURE

Referring more particularly to Fig. 4, the portions of this diagram which are of interest in connection with anti-collision service are four groups of equipment 75, 229, 230 and 231. These four units are respectively the transmitter unit hereinbefore referred to for continuously sending out signals representing the airplane altitude, an anti-collision receiving unit for receiving similar signals from other planes, an anti-collision oscilloscope unit for displaying the received indications and a rotatable anti-collision antenna unit, which is the preferred antenna to be used with the receiving unit 229 in the better class of installations.

The transmitter unit 75, Fig. 4, principally consists of the fixed frequency U. H. F. transmitter 99 operating at the assigned air frequency $F_2$ together with a pulse generator 232, a tunable audio oscillator 233 and a modulator 234 which modulates the amplitudes of the pulses from 232 in accordance with the sine wave from 233. A simple barometer mechanism 235 controls the frequency of the tunable oscillator 233, e. g. by rotating a light weight silvered mica disc serving as a variable condenser. The barometer mechanism 235 is preferably much more rugged and simpler than the usual type of altimeter. It does not need, and preferably should not have, any reset arrangement to correct for varying barometer readings on the ground; and in addition its linkage may be a simple system producing a swing of about 90° rather than a high-motion linkage with gears for producing 3600° of rotation. The other minor elements 233, 232 and 234 will be simple circuits of well-known design, while the transmitter 99 will be a low power fixed tuned transmitter with no controls.

The anti-collision receiving unit 229, for example, consists of a fixed tuned $F_2$ receiver 236 whose output passes through a width selector 237 for screening out all other types of pulses used in other services. From 237 the anti-collision pulses pass through a conventional detector 238 which acts in the usual way to derive a signal corresponding to the envelope of the received energy. The envelope so derived may correspond to a complex wave comprising components of several different low audio frequencies if signals are being simultaneously received from several nearby planes at different altitudes. In order to select from all these component frequencies only those representing altitudes close to the altitude of the receiving plane itself, the audio tone from oscillator 233 of this plane is mixed with the complex received signal in the mixer 239 and then passed through a low pass filter 240. Only those received signal components whose tone frequency is within fifty cycles of the tone frequency of the receiving plane itself will pass through this filter 240.

In those cases where the installation of a rotatable antenna is impracticable, the receiver 236 may be fed by a fixed antenna having a moderate forward directivity, and in this type of installation the output from filter 240 will be applied directly to a pair of deflecting plates of the oscilloscope 230. Wherever practicable, however, it is preferred to use a rotatable antenna unit such as 231 and in such installations the output from filter 240 will be connected in series with a D. C. voltage source 242 to a resistance type goniometer 243 (i. e. an endless circular potentiometer with four fixed taps and two sliding brushes) and thence will be distributed in varying ratio among the four deflection plates of the oscilloscope 230.

Assuming that the rotary antenna installation is used, the resistive goniometer will be arranged to rotate in synchronism with the rotary antenna 244, so that when this antenna is receiving predominantly from the right the voltage from source 242 will be applied to the proper plates to shift the cathode ray spot of the oscilloscope 230 to the right. As the antenna rotates to point straight ahead, the distributor action of resistive goniometer 243 will transfer the potential from 242 to the other pair of plates of 230 so as to deflect the spot upward. Finally as the antenna 244 rotates to receive predominantly from the left the potential of 242 will be applied to the deflection plates in such sense as to shift the oscilloscope spot to the left. Simultaneously with such transfer of the D. C. potential from 242, the rotation of goniometer 243 will also correspondingly transfer any signals delivered from the output of filter 240 so that these will be always effective to cause a radial reflection of the spot. The amplitude of such radial deflection will be dependent upon the received signal strength, and thus will constitute an approximate indication of the distance of the plane whose signals are being received.

Preferably, this rotating antenna is located in the front of the airplane nose or, where engines make this impossible, immediately below the nose and inclined slightly upward so as to be effective for reception from the front of the airplane and over a comparatively wide angle at each side. When the rotatable antenna is pointing directly backwards or in any other direction in which directive reception is impracticable—the switch 245 controlled by a cam on the antenna rotating mechanism removes ground from 237 to block the effective reception of signals.

The inclined reflector plate 246 which is shown behind the rotary antenna 244 is not necessary for the anti-collision service but is provided for the Terrain Clearance Service hereinafter described.

In order to permit the pilot to test for the presence of planes in higher and lower levels as well as to determine if any planes are at or near his own level, the push-buttons 247 and 248 are provided in oscilloscope unit 230. The buttons are connected so that 247 will momentarily raise the frequency of tunable oscillator 233 by forty cycles while 248 will correspondingly lower it by forty cycles. Depression of either of the buttons will also momentarily interrupt the transmission of the tone from 233 to 234 so as to avoid sending out an incorrect altitude indication during the testing interval. The upward or downward shift of the tone frequency from 233 changes the tone applied to mixer 239 so that a higher or lower group of frequency components received from 238 becomes effective to pass through filter 240 to the indicator 230.

By the use of pulses for the anti-collison transmission, the difficulties of simultaneous reception from several nearby planes have been greatly minimized. Since the pulses are only one microsecond in width and are transmitted only 5000 times per second, each transmitter is actually "on the air" only 1/200 of the time. Thus, even if seven or eight planes are simultaneously transmitting within effective range of the given receiving plane under consideration, the pulses of these seven or eight transmissions will only overlap about three per cent of the time. At the same time the use of amplitude modulation of these pulses provides the advantage that when several series of pulses interleaved in random fashion are simultaneously received, the amplitude demodulator 238 of the given plane can successfully demodulate all these signals simultaneously to derive a complex wave having frequency components corresponding to all the seven or eight tone modulations of the separate signals.

TERRAIN CLEARANCE FEATURE

Since this service is performed by transmitting a pulse from the plane and receiving the same pulse after reflection from the earth, no equipment is required on the ground. By using the transmitter and receiver of the anti-collison equipment, the only additional equipment required on board the airplane consists of unit 250 and oscilloscope 251.

No special pulses need be transmitted for the terrain clearance indications but instead, the self-distance pulses of ½ microsecond width which are sent out from transmitter 99 under control of pulse generator 100 as hereinbefore described are made use of for measuring terrain clearance also. Although the antenna 252 which radiates these pulses is primarily designed for maximum radiation in a horizontal direction, this antenna will give sufficient downward radiation for terrain clearance measurements since these measurements need only be made up to elevations of about two miles above the earth.

The self-distance pulses emitted from transmitter 99 and radiated downward toward the earth will be reflected back to the airplane where they will be picked up by rotating antenna 244 of the anti-collision equipment. In order to increase the efficiency of this antenna for radiations arriving from a downward direction, the inclined reflector 246 is preferably provided as previously mentioned, thus serving to tilt the maximum lobe of the reception diagram down toward the earth during the intervals when the antenna 244 is aimed toward the back of the plane. During these same intervals, the cam switch 245 is arranged to ground the lead extending to width selector 253 in terrain clearance unit 250 so that this width selector becomes operative.

The self-distance pulses picked up by antenna 244 after reflection from the ground during such intervals are applied as usual to receiver 236 of the anti-collision receiving unit 229, but having ½ microsecond width, these pulses pass through width selector 253 instead of width selector 237. From the output of selector 253, the pulses are applied to the grid of terrain clearance oscilloscope 251 thus producing a luminous spot on the screen thereof. The position of this spot is determined by the deflector plates of the oscilloscope 251 which receive a saw-tooth sweep voltage from blanked sweep circuit 254. In order to synchronize this sweep circuit 254 so that its saw-tooth sweep voltage will commence to rise at the instant when the self-position pulses are sent out from the airplane, this sweep circuit is connected as shown to the output of the self-position pulse generator 100 in unit 73. Thus, each time a self-position pulse is sent out the sweep circuit 254 commences to apply a rising sweep voltage to the plates of oscilloscope 251 and the value which this voltage has attained by the time the corresponding pulse returns to the plane after reflection from the earth, determines the position of the spot on the screen of the oscilloscope. Accordingly, the position of the spot on this oscilloscope with respect to the starting point of the sweep will represent the absolute altitude or terrain clearance.

Since the antenna 244 is used during about half its revolution for reception of anti-collision signals, the reception of terrain clearance pulses will be blocked during these periods by interruption of the ground applied from cam switch 245 to the width selector 253. Actually this interruption may be maintained for about ¾ of a revolution of the antenna 244 so that the reception of altimetry pulses will only take place during the remaining 90° of rotation. This will mean that the spot representing the terrain clearance on the altimetry indicator will be keyed off and on at the rotation rate of antenna 244, i. e. once per second.

QUASI-RADAR FEATURE

The small equipment shown at 255 in Fig. 4 is included on each of the planes using high density airports and cooperating quasi-radar equipments, such as shown at 256 in Fig. 9, are installed at these airports, and used as the principal means of determining the positions, altitudes and identities of the airplanes around such airport. With such equipment at airports is included control and indicating equipment described in detail hereinafter.

The additional equipment required on the planes for this purpose comprises merely an identity code keyer 257 continuously actuating a set of contacts at a slow rate in accordance with the Morse code representing the airplane's identification number, a simple barometer 258 (consisting of a Sylphon bellows and a simple lever linkage for swinging a condenser plate through 90 degrees under control of the movement of such bellows), and a variable delay circuit 259, including one or two tubes and arranged to trigger a pulse 10 to 100 microseconds after the reception of an applied pulse, the delay being dependent upon the capacity of the above mentioned variable condenser.

The equipment required on the ground for the quasi-radar service consists merely of the quasi-radar receiver 256, shown in Fig. 9. No corresponding quasi-radar transmitter would be required since the rotary beacon 71 already described for providing azimuth indications would serve as the transmitter for the quasi-radar service.

The quasi-radar receiver 256 comprises the four $F_2$ receiving antennas 260, 261, 262, 263, preferably located on the same mast as the transmitting antennas 80—83 of beacon 71. These antennas are connected to the goniometer 264 which is rotated in synchronism with beacon 71 by a Selsyn motor 265. The output of goniometer 264 is connected to a receiver 266 which includes a 3 microsecond width selector 267 and a pulse reshaper 268. The output of the reshaper 268 is applied to the grid of one or more oscilloscopes 269.

The principles of operation of both the radar reply equipment 255 in the airplane and the quasi-radar receiver 256 on the ground can best be explained from the following sequential description of operation of the complete quasi-radar service.

The transmission of the signals of rotary beacon 71, Fig. 5, takes place exactly as previously traced in connection with the self-location service. The pulse generator 88A generates first a 5 microsecond and then a 3 microsecond pulse which are modulated onto $F_1$ carried by transmitter 77, and then radiated from antennas 80—83. As previously explained, the radiations of these two pulses are characterized by different radiation patterns having the form of a figure of eight and a cardioid so oriented as to sharply define one single sweep line direction along which only the 3 microsecond (but not the preceding 5 microsecond pulse) can be received. The transmission of the two successive pulses in accordance with these different radiation diagrams is controlled by switching circuit 78 and goniometers 79 and 85.

In addition to the transmission of these two successive pulses, as previously described, the rotary beacon 71, Fig. 5, is required to perform one additional special function in connection with the quasi-radar receiver 256. This additional function is the synchronizing of the sweep circuit 272 by the double pulse generator 76. For this purpose the pulse generator 76 should be arranged to deliver a synchronizing pulse to sweep circuit 272 at the instant when it transmits the second or third microsecond pulse of its double pulse signal. Thus, each time a pair of pulses is sent out by rotary beacon 71, the sweep circuit 272 is triggered by generator 76 at the instant of transmission of the 3 microsecond pulse. This sweep circuit 272 then commences to deliver to deflection windings 270 of the several oscilloscopes a deflection current starting at zero and uniformly increasing in value during 240 microseconds which ensue before the next double pulse transmission.

While this deflection current through circuit 272 is increasing from zero, the double pulse signals from the rotary beacon 71 are being propagated as before, to the airplane, where they are received in the unit 73 exactly as previously described in connection with the self-location service. As explained in such previous description, no effective output is delivered by width selector 94, excepting during those short intervals when the imaginary sweep line of the beacon 71 is very nearly aligned with the airplane. During such intervals, however, the selector 94 will pass the 3 microsecond pulses of each double pulse signal received.

Assume that the double pulse signal being traced is received by an airplane which is very nearly exactly aligned with the imaginary sweep line of the beacon 71. The width selector 94 of such airplane will consequently pass the 3 microsecond pulse of such double pulse signal and this pulse is not only applied to the lock-in oscillator 95 for controlling the azimuth indication on the plane as previously described, but is also applied to the radar reply unit 255. In this unit 255 the 3 microsecond pulse is connected directly to the normal contact of identity code keyer 257 and indirectly through delay circuit 259 to the off-normal or active contact of this same code keyer 257.

Assuming that this keyer is in normal condition, i. e. its contacts are not actuated to represent the dots or dashes of the airplane's identity code, the 3 microsecond pulse will, therefore, pass immediately from width selector 94 through code keyer 257 to transmitter unit 75, where it will be applied through limiter 102 to transmitter 99. The transmitter 99 will then emit a 3 microsecond pulse of $F_2$ carrier substantially instantaneously after the corresponding 3 microsecond pulse of the double pulse signal is received from the beacon M.

If the keyer 257 had been in off-normal condition (i. e. with its contacts actuated for the production of a dot or dash) at the instant when the 3 microsecond pulse was received from rotary beacon 71, the pulse would have had to pass through delay circuit 259 before being delivered through the keyer to the transmitter unit 75. Under such conditions, the radar reply pulse sent out by transmitter unit 75 would have been correspondingly delayed by ten or more microseconds, the exact amount of the delay being determined by the delay action of circuit 259. Since this circuit is designed to introduce a delay depending upon the position of barometer mechanism 258, the extent to which the radar reply signal from transmitter unit 75 would be delayed would depend upon the altitude of the airplane.

It will thus be seen that during normal or non-keying intervals the airplane will transmit a radar reply signal substantially instantaneous but that during keying interval, the airplane will transmit its radar reply with a delay representative of its altitude.

In either case, the radar reply signal after being transmitted must travel back to the center of the airport where it will be picked up by antennas 260—263 of quasi-radar receiver 256. The reception diagram of this group of antennas will be favorable for receiving this signal since the goniometer 264 is synchronized with beacon M in such phase that the maximum reception direction of antennas 260—263 is always pointed in the same direction as the imaginary sweep line of beacon 71.

The radar reply signal thus picked up by antennas 260—263 and transmitted in cooperation with goniometer 264 is applied to receiver 266. This receiver detects the signal to produce a pulse corresponding to the envelope. Also, as previously mentioned, the receiver 266 contains a pulse width selector so as to pass only pulses of 3 microseconds width, these pulses being then re-shaped at 268 to yield extremely narrow pulses capable of defining sharp spots on the oscilloscope screen. The positions in which the spots will appear on the screens of oscilloscopes 269 is determined by the deflection windings 270 which are being increasingly energized by the uniformly rising current from sweep circuit 272 as previously described.

It will be remembered that the sawtooth deflection current commenced to rise from zero at the instant when generator 76 produced the 3 microsecond pulse for transmission from the rotary beacon 71. Thus, during the time when such 3 microsecond pulse was traveling outward from the beacon to the plane and during the time when the corresponding radar reply pulse was traveling back from the plane to the quasi-radar receiver, the currents produced in deflection windings 270 by sweep circuits 272 have been constantly increasing. At the instant when the radar reply pulse arrives at quasi-radar receiver 256 and is applied to the grids of oscilloscopes 269 to illuminate beam spots on their screens, therefore, the deflection current will have a value dependent upon the time of propagation to the plane and back. The radial displacements of the spots from the centers of the oscilloscopes will, therefore, correspond to the distance of the plane from the central part of the airport where beacon 71 and quasi-radar receiver 256 are located.

The angular direction in which the spots are located from the centers of the screens will depend upon the rotary positions of the windings 270. Since these windings are rotated in synchronism with the beacon 71, the direction of deflection of the spots will correspond to the direction of the imaginary sweep line of beacon 71. But the radar reply impulses are sent out only from those planes which are aligned with this imaginary sweep line, as previously explained, and therefore, the angular direction to the spots will correspond to the azimuth angle of the plane.

Thus, the spots on the screens of oscilloscopes 269 will have radial displacements from the center corresponding to the radial distances of the airplanes from the airport, the directions of these displacements corresponding to the direction of the airplanes.

The above discussion applies to the spots produced during the normal or non-keying intervals when the radar reply signals are sent out by the airplane immediately upon the receipt of the 3 microsecond pulses from the rotary beacon 71. During the keying intervals when the code keyer 257 of the radar reply signals transmitted from such plane will be delayed by an interval representing the airplane's altitude as previously explained. The corresponding spots shown on the screen of oscillographs 269, during such keying intervals, will therefore be displaced outward by an extra distance corresponding to the airplane's altitude. Thus, during these keying intervals, the spots will be shown in a fictitious or "ghost" position, the radial direction of deflection being correct but the extent of radial displacements being greater than the correct amount by a distance representing the airplane's altitude.

It will thus be seen that the spots representing any airplane will normally be shown on the screen in a position accurately representing the airplane's true position but will jump outward during the keying intervals to a ghost position somewhat farther out from the center of the screen. The separation of the true and ghost positions of the spot will represent the altitude of the airplane. This is illustrated in Fig. 10 where the tracing of the cathode ray beam is indicated by broken line 273 on oscillograph screen 274. The spot 275 represents a plane's true position in distance and azimuth.

If the existing wire facilities are of the coaxial cable type and are capable of handling wide bands, then the whole system previously outlined can still be carried out with no change other than the substitution of the coaxial cable communication system in place of the beamed radio link system.

An airway having two terminals with interconnecting relay stations is shown in Figs. 12 and 13 taken together, the relay stations or towers being shown in more detail in Figs. 1A and 14. The airport of Fig. 12 is representative of a master terminal for controlling the airplane guidance and communication facilities and for directly receiving the indications of airplane positions. Such airway may be assumed, for example to be about 350 to 450 miles long with 16 radio stations spaced along the route to be followed with the master airway terminal station of Fig. 14 located at the western airport and the somewhat simpler terminal station of Fig. 13 located at the eastern airport.

As hereinbefore explained for Fig. 14, the airway terminal is provided with a quasi-radar indication representing the positions, altitudes and identities of all planes flying along the airway, and in addition, a three dimensional display board is provided upon which the information from the quasi-radar indicator is semi-automatically displayed.

AIRPORT TO AIRPORT COMMUNICATION

In tracing the sequential operations involved in airport-to-airport communications, specific reference will be made to the diagrams of Figs. 1, 12 and 13. Referring first to Fig. 12 it may be assumed that one of the telephone sets intended for airport-to-airport calls has been connected through switchboard 350 to channels 11w and 11e in equipments 351 and 352, respectively. The microphone circuit of this telephone set will be connected to input 11e of the modulation and channel combining equipment 351, while the receiver circuit of this telephone set will be correspondingly connected to output 11w of the channel separation and demodulation equipment 352. It may be assumed also that corresponding connections have been made in the eastern airway terminal equipment shown in Fig. 13.

Now if the telephone user at the western airway terminal speaks into his microphone, the voice signals will be transmitted through switchboard 350 to input circuit 11e of equipment 351.

The equipment 351 is arranged to produce 23 interleaved sets of pulses, each set including 12,500 pulses per second. For the moment, it may be assumed that the successive pulses of any one set of 12,500 pulses per second are equally spaced 80 microseconds apart. One such set of 12,500 pulses per second consists of pulses 2 microseconds long hereafter called synchronizing pulses. The other 22 sets of pulses consist of pulses about ½ microsecond long for carrying 22 separate signals, each such set being referred to as a communication channel. The combined series of pulses resulting from the interleaving of these 23 sets of pulses will, therefore, contain a total of 287,500 pulses per second spaced 3.48 microseconds apart, every 23d pulse of such combined series being two microseconds in length while all the others are about ½ microsecond in length.

Actually the 12,500 pulses of any one communication channel are not uniformly spaced 80 microseconds apart as above assumed, but are initially offset as hereinbefore explained in connection with push-pull" time modulation so that the time intervals between successive pulses of each channel are alternately substantially 78 and 82 microseconds. These pulses are further displaced or modulated in "push-pull" manner according to the instantaneous value of the signals to be transmitted.

For producing the required time modulation of the pulses of the 22 communication channels, the pulses of each channel are time shifted by a time modulation circuit similarly as disclosed in the aforementioned application, E. M. Deloraine, Ser. No. 531,851, now Patent No. 2,509,218 issued May 30, 1950 and E. M. Deloraine-P. R. Adams Ser. No. 534,284, now Patent No. 2,421,017 issued May 27, 1947 which is controlled by signals applied to the corresponding input of equipment 351. Thus, the 12,500 pulses of the first eastbound channel 1e are shifted by a time modulation circuit which is controlled from input circuit 1e of the equipment 351, while the 12,500 pulses of the second easbound channel 2e are shifted by a time modulation circuit which is controlled from input circuit 2e of the equipment 351, etc.

Similarly, in the case of the particular communication now being traced in detail, the pulses of the eleventh eastbound channel 11e are time modulated (by a corresponding time modulation circuit) in accordance with the voice signals applied to input circuit 11e of the equipment 351. The voice-modulated pulses of channel 11e (together with the pulses of all the other channels) are transmitted to the micro-wave transmitter 353. Such transmitter responds to each applied pulse by delivering a corresponding brief pulse of micro-wave carrier at a frequency $a_1$, and such brief pulses of carrier are radiated eastward by sharply beamed antenna 354. Referring now to Fig. 14 which may for the moment be assumed to represent tower station I (see Fig. 1) the pulses of micro-wave carrier on frequency $a_1$ which are transmitted on a narrow beam from the terminal equipment of Fig. 12 are received by tower antenna 355 and applied to the wide band eastbound repeater 356. This repeater detects the applied carrier into the form of pulses, and applies these pulses to remodulate another carrier of slightly different micro-wave frequency $a_2$, which will then be radiated from tower antenna 357 in a narrow beam directed toward the next tower station II.

At the tower station II, a similar reception, repetition and retransmission take place, the new transmission being at a new carrier frequency $a_3$ (see Fig. 1A). In similar fashion the pulses will be repeated with change of carrier frequency from tower to tower until finally they arrive at the eastern airway terminal equipment Fig. 13 (see also airport 2, Fig. 1).

Referring to Fig. 13 which represents the eastern terminal (airport 2, Fig. 1), the signals will arrive from tower station XVI at carrier frequency $a_2$ and will be picked up by receiving antenna 358, and detected in micro-wave receiver 359 to yield 287,500 pulses per second whose timing corresponds to that of the pulses delivered to micro-wave transmitter 353 at the western terminal of the airway. From receiver 359 these 287,500 pulses are delivered to channel separation and demodulation circuit 360.

In this circuit 360 the separate sets of pulses serving to separate 22 channels will be sorted out by an electronic distributor operating according to the same general principles as a multiplex telegraph distributor, but using electronic circuits in place of mechanical moving parts and working it at a much higher speed than used in ordinary multiplex telegraphy. The special synchronizing pulses of 2 microsecond length are used to maintain this electronic distributor properly synchronized in the manner explained in the aforementioned applications of E. M. Deloraine, Ser. No. 531,851 and E. M. Deloraine-P. R. Adams, Ser. No. 534,284. The result of this distributor action is to separate the 287,500 pulses per second from receiver $E_4$ into 22 channels or sets of pulses each having only 12,500 pulses per second. The pulses of each channel are now demodulated by a set of 22 time modulation detector circuits of known type also comprised in equipment 360. Such detector circuits act to convert the inequalities of spacing of a series of pulses into varying voltages. The aforementioned applications of E. M. Deloraine, Ser. No. 531,851 and E. M. Deloraine-P. R. Adams, Ser. No. 534,284, disclose suitable forms of time modulation detector circuits.

Thus, the pulses of the eleventh eastbound channel 11e whose spacing was originally varied in time according to the speech signals from the microphone at the western terminal will, after detection in a time modulation detector circuit 360, reproduce the original speech modulating voltages which will then be delivered to output circuit 11e of the equipment 360. Such speech voltages will then be applied through the switchboard 361 to the receiver of the telephone set 362 under consideration at the eastern terminal of the airway.

When the telephone user at the eastern terminal of the airway starts to talk in reply to the speech signals just traced, the resulting voice currents from his microphone will be transmitted back to the receiver of the corresponding telephone set at the western base in the same manner as above traced. In this case, the channel used will be channel 11w instead of 11e and equipment 363, transmitter 364 and antenna 365 modulate, transmit, and radiate the signal. In each tower the receiving antenna 366, repeater 367 and transmitting antenna 368 are used. At the western terminal of the airway, the receiving antenna 369, micro-wave receiver 370 and channel separation and demodulation equipment 352 serve to pick up, receive, separate and demodulate the signals which are then delivered through switchboard 350 to the receiver of the appropriate telephone set.

In the same way as above described, any other pair of telephones at the western and eastern terminals of the airway may be interconnected for conversation and eleven such two-way conversations can simultaneously be carried on over channels 11e—22e and channels 11w—22w.

Although the communication above described in detail was assumed to be a two-way telephone conversation, the channels 11w—22w and 11e—22e can handle any other types of communications which are capable of being sufficiently accurately represented by defining their instantaneous amplitudes 12,500 times per second. If the communications are composed of a mixture of sine waves as in the case of voice communications, the channels will satisfactorily reproduce all frequency components between 0 and 3,000 cycles per second. In the case of communications which essentially consist of a number of discrete dots of varying amplitudes, however, the dotting frequency can be as high as the number of pulses transmitted, i. e., 12,500 per second. Any one of the channels 11e—22e or 11w—22w is, therefore, capable of handling a facsimile transmission having a dotting rate of 12,500 per second which is several times higher than the speed of facsimile transmission normally attainable over telephone wires.

It should also be noted that each of the channels 11e—22e and 11w—22w is capable of transmitting frequencies as low as may be desired down to and including direct current of either positive or negative polarity. Accordingly, these channels are readily usable for transmitting teleprinter signals without the need for any special converters.

In the pictorial representation of Fig. 13, it is assumed that the eleven eastbound channels 11e—22e and the eleven westbound channels 11w—22w are being used at one time for interconnecting eight telephone hand sets 362, one two-way teleprinter machine 371 and two high speed facsimile senders and reproducers 372, 373 at the western terminal with a corresponding number of hand sets, teleprinters and facsimile equipments at the eastern terminal. For simplicity of illustration this figure shows only the number of telephone sets and other communication equipments which are assumed to be in use in this particular example. In practice, of course, one would usually have telephones, teleprinters and facsimile equipments amounting to several times the number of simultaneously available channels, these telephone sets or facsimile or telegraph instruments being connected to free channels through the switchboard at those moments when it is desired to use them. It should also be understood that the system could be designed to handle many more than 22 two-way channels, thus providing more than eleven two-way channels for airport-to-airport communication if required.

AIRPORT TO PLANE COMMUNICATION

Referring to Figs. 1, 12 and 14, it may be assumed that one of the traffic control personnel, or a company dispatcher of one of the airlines at or near the west terminal (airport 1 of Fig. 1) wishes to speak to the airplane 4 shown near repeater station II. Assume that the receiver and microphone connections of the telephone set assigned to this traffic controller or company dispatcher are plugged through the switchboard to output circuit 1w of channel separation equipment 352 and to input circuit 1e of channel combining equipment 351 (see Fig. 12).

Now when the traffic controller or company dispatcher speaks into the microphone of his telephone set, the resulting voice currents are delivered to input circuit 1e of equipment 351 thus time modulating the corresponding series of pulses in the manner described in the preceding section. Just as before, the pulses of this channel together with all the pulses of the other channels serve to modulate the micro-wave transmitter 353 which then transmits corresponding pulses of micro-wave carrier over antenna 354 to the next tower.

As before, these pulses are repeated from tower to tower with a slight change of the micro-wave carrier frequency. In addition to repeating these waves as before, certain ones of the towers are also arranged to pick out the particular channel 1e which is now being considered, and to rebroadcast the speech modulation thereof at a V. H. F. frequency suitable for reception by the V. H. F. radio-telephone equipment of the airplanes (see Fig. 4).

Referring to the table herebelow, it will be seen that each diifferent tower is arranged to select a particular channel number from the microwave artery for transmission to the planes on a corresponding V. H. F. frequency. The towers which are arranged to pick out channel 1e from the micro-wave artery for broadcasting to the airplanes, will be seen to be towers Nos. II and IX. The manner in which each of these two towers performs its function will now be traced in detail with reference to Fig. 14.

*Table I*

| Microwave links | Tower number | | | | | | | | | | | | | | | |
|---|---|---|---|---|---|---|---|---|---|---|---|---|---|---|---|---|
| | I | II | III | IV | V | VI | VII | VIII | IX | X | XI | XII | XIII | XIV | XV | XVI |
| Receive from west on Frequency | $a_1$ | $a_2$ | $a_3$ | $a_1$ | $a_2$ | $a_3$ | $a_1$ | $a_2$ | $a_3$ | $a_1$ | $a_2$ | $a_3$ | $a_1$ | $a_2$ | $a_3$ | $a_1$ |
| Repeat toward east on Frequency | $a_2$ | $a_3$ | $a_1$ | $a_2$ | $a_3$ | $a_1$ | $a_2$ | $a_3$ | $a_1$ | $a_2$ | $a_3$ | $a_1$ | $a_2$ | $a_3$ | $a_1$ | $a_2$ |
| Receive from east on Frequency | $b_2$ | $b_3$ | $b_1$ | $b_2$ | $b_3$ | $b_1$ | $b_2$ | $b_3$ | $b_1$ | $b_2$ | $b_3$ | $b_1$ | $b_2$ | $b_3$ | $b_1$ | $b_2$ |
| Repeat toward west on Frequency | $b_1$ | $b_2$ | $b_3$ | $b_1$ | $b_2$ | $b_3$ | $b_1$ | $b_2$ | $b_3$ | $b_1$ | $b_2$ | $b_3$ | $b_1$ | $b_2$ | $b_3$ | $b_1$ |

SPEECH WITH AIRPLANES

| | | | | | | | | | | | | | | | | |
|---|---|---|---|---|---|---|---|---|---|---|---|---|---|---|---|---|
| Received from planes on Frequency | [1] 6t | 1t | 2t | [1] 6t | 3t | 4t | [1] 6t | 5t | 1t | [1] 6t | 4t | 2t | [1] 6t | 5t | 3t | [1] 6t |
| Insert into Microwave Artery Channel | 6w | 1w | 2w | 6w | 3w | 4w | 6w | 5w | 1w | 6w | 4w | 2w | 6w | 5w | 3w | 6w |
| Select from Microwave Artery Channel | 6e | 1e | 2e | 6e | 3e | 4e | 6e | 5e | 1e | 6e | 4e | 2e | 6e | 5e | 3e | 6e |
| Transmit to planes on Frequency | [1] 6r | 1r | 2r | [1] 6r | 3r | 4r | [1] 6r | 5r | 1r | [1] 6r | 4r | 2r | [1] 6r | 5r | 3r | [1] 6r |

RADIO RANGE TIMING

| | | | | | | | | | | | | | | | | |
|---|---|---|---|---|---|---|---|---|---|---|---|---|---|---|---|---|
| Timing Signal received over Channel | 8e | 7e | 8e | 7e | 8e | 7e | 8e | 7e | 8e | 7e | 8e | 7e | 8e | 7e | 8e | 7e |

QUASI RADAR

| | | | |
|---|---|---|---|
| Quasi Radar Signal timed over Channel | 10e | ----- | for all towers |
| Radar Reply returned westward over Channel | 7w | 10w | for all towers |

[1] NOTE: Frequencies 6t and 6r are normal standby frequencies of airplane radio telephone sets.

The eastbound microwave radiation arriving at tower II or IX from the preceding tower (I or VIII) is picked up by receiving antenna 355, Fig. 14, and passes through antenna 357 in the same way as previously described. At the same time that the pulses are being repeated through repeater 356, however, these pulses are also applied from this repeater to the drop channel or outbranching circuit 374 which is arranged to pick out of all the sets of pulses representing the 22 different eastbound channels, only the three particular sets representing channels 1e, 7e and 10e. Since the channel now under consideration is the first eastbound channel 1e, the pulses of this channel will be picked out and delivered through the corresponding output 1e of drop channel circuit 374 to demodulation circuit 375. This latter circuit detects the time modulations of the pulses to yield the speech frequencies of such modulations, and applied these speech frequencies to amplitude modulated V. H. F. transmitter 376.

The V. H. F. transmitters 376 of the various towers I, II . . . XVI are fixedly tuned to operate at different ones of the eight possible reception frequencies of the airplanes' radio-telephone equipment. These various settings of the V. H. F. transmitters are shown in Table I, in which the eight possible receiving frequencies of the V. H. F. airplane radio-telephone are respectively designated as 1r, 2r . . . 8r, while the corresponding eight transmitting frequencies of the aircraft V. H. F. radio-telephone equipments are respectively designated as 1t, 2t . . . 8t. As shown in this table the towers II and IX now under consideration should have their drop channel circuits 374, Fig. 14, arranged to select from the microwave artery eastbound channel No. 1e and the V. H. F. transmitters 376 of these two towers should be fixed-tuned to frequency 1r.

Thus, the speech frequencies applied to transmitter 376 of tower II or IX are modulated onto a V. H. F. carrier of frequency 1r and thence are applied to the wide angle antenna arrays 377 and 378 for radiating this modulated V. H. F. carrier in all directions from the tower.

Assume that the airplane 4 engaged in the communication is adjacent tower No. II and has its V. H. F. radio-telephone equipment set 379, Fig. 4, for reception on frequency 1r and transmission on frequency 1t. (The manner of arranging for such selection of channels will be explained below but may be disregarded at the moment.) The speech modulated V. H. F. carrier from tower II will be propagated to the plane where it will be picked up by the antenna of V. H. F. receiver 380. This receiver 380 amplifies and detects the signals to yield speech waves which are applied to the corresponding headphones.

When the pilot of the airplane replies to the speech communication by speaking into the microphone of his radio-telephone transmitter 381 the speech modulated waves are radiated on V. H. F. carrier frequency 1t. These V. H. F. waves of frequency 1t are radiated downward to tower II where they are picked up by one of the receiving antenna arrays 382 and 383, Fig. 14. From antennas 382, 383, the V. H. F. waves are applied to receiver 384 which receives and demodulates these to yield speech frequencies in the usual way. Such speech frequencies are then applied to channel insert circuit 385.

The channel insert circuit 385 is of a type generally used for time modulated pulse transmissions such as set forth in the aforementioned applications E. M. Deloraine, Serial No. 531,851, filed April 20, 1944, and E. M. Deloraine-P. R. Adams, Serial No. 534,284, filed May 5, 1944, both of which have previously noted as now being patented includes a pulse generator normally producing 12,500 equally spaced pulses per second, this pulse generator is synchronized by energy from the westbound repeater 367, so that these pulses are produced at the correct instants for representing the first westbound channel 1w. A time modulation circuit is associated with this pulse generator for shifting the timing of the generator pulses under the control of the applied signal voltages, the working bias being so adjusted that these pulses are normally slightly unequally spaced. Arrival of speech frequencies from receiver 384 acts to increase or decrease this working bias so as to correspondingly increase or decrease the inequality or time displacement of the pulse spacing. The pulses delivered from channel insert circuit 385 to westbound repeater 367 are thus properly timed for fitting into their assigned time positions in the multi-channel westbound artery and in addition, are characterized by slight variations of timing representative of the speech signals from the airplane.

In westbound repeater 367, the pulses of such channel 1w are added in between the other pulses of the multi-channel artery and modulated with the other pulses onto the appropriate microwave carrier. As will be seen from Table I, the carrier frequency used for repeating westward from tower II is microwave frequency b2, while that used for repeating westward from tower IX is microwave frequency b3.

The microwave signals are now repeated westward from tower to tower in the manner previously described, the receiving antenna, repeater, and transmitting antenna employed in each tower being 366, 367 and 368, respectively. Finally, when the signals arrive at the western terminal, they are received by antenna 369, detected in receiver 370 and applied to channel separation and demodulation equipment 352. The pulses of the first westbound channel 1w are segregated from the pulses of other channels and demodulated as previously described so as to yield the same speech signals originally delivered to the microphone of the airplane radio-telephone transmitter 381. These speech signals are then delivered over output 1w to the switchboard 350 from which they are applied to the receiver of the telephone set being used for the communication under consideration.

In the foregoing detailed description, it was assumed that one of the traffic controllers or company dispatchers, whose telephone set had been connected through the switchboard 350 to the outgoing and incoming channels 1e and 1w was carrying on a communication with the pilot of an airplane near tower II and it was assumed without explanation that the V. H. F. radio-telephone equipment of this airplane had been conveniently tuned to the corresponding V. H. F. frequencies 1t and 1r.

In order to arrange for an appropriate setting of the airplane radio-telephone equipment and a corresponding connection of the telephone set of the traffic controller through switchboard 350 to the appropriate communication channels, it is desirable to reserve one set of channels, for standby use, such channels not being normally used for conversations with individual planes, but being reserved solely for broadcasting brief messages to all planes along the air route as well as for giving instructions with respect to the channels to be used for any desired individual communications. In the system illustrated, it has been assumed that the sixth receiving and transmitting frequencies of the V. H. F. radio-telephone equipments on each airplane would be designated as the standby channels and it is assumed that all pilots would be instructed to keep their radio-telephone equipments normally set for reception on V. H. F. frequency 6r and transmission on V. H. F. frequency 6t. Correspondingly, in the western terminal equipment of the airway shown in Fig. 12, the sixth eastbound and westbound channels 6e and 6w are illustrated as permanently connected to head set and microphone 386 and 387 which are used by a special standby operator.

If any traffic controller (or other authorized person) wishes to speak to a particular plane which is known to be flying along a certain section of the airway within line of sight of a certain group of towers, such traffic controller will ask the standby operator to set up the desired connection, mentioning in his request the identification number of the plane and the approximate section of the airway over which it is flying as well as the number of his own telephone instrument. The standby operator, by comparing the connections which she has already set up for conversations with other planes will observe which of the five two-way channels 1e—5e and 1w—5w are free and will select an appropriate pair of these channels which is branched out at a tower within easy reach of the airplane desired. Thus, if the first and third channels are already in use so that only channels 2e, 2w, 4e, 4w and 5e, 5w are free, and if the plane is flying between towers VI and VII, she may decide to use channels 4e and 4w for the desired communication between the traffic controller and the plane (see Table I). In such case, she will first speak into her microphone 387 and will announce the identity number of the plane desired and the number of the channel which she is to select, e. g., "calling PG58—please take frequency 4." The pilot will first acknowledge by repeating the message, "Plane PG58 taking frequency 4" and will then switch his V. H. F. radio-telephone set to frequencies 4t and 4r. At the same time, the operator will connect the instrument of the traffic controller desiring the connection through her switchboard 350 to the fourth eastbound and westbound channels 4e and 4w. When the pilot has shifted to frequencies 4r and 4t he will announce his presence by saying "PG58 answering." Thereafter the conversation between the traffic controller and airplane pilot can take place in the same way as above traced in detail, excepting that channels 4e and 4w and frequencies 4t and 4r will be used in place of the channels and frequencies 1e, 1w, 1t and 1r previously assumed.

Referring to Table I, it will be noted that the standby channels 6e and 6w are branched in and out at every third tower so that any airplane will always be within range of one of the towers through which these standby channels are branched. The other channels 1e—5e and 1w—5w are distributed so that these are repeated at only very long intervals and, moreover, are shuffled in such a way as to render the maximum service to the maximum number of airplanes under any reasonable likely conditions.

If the pilot of any airplane desires to initiate communication with the airbase, he must speak to the standby operator using his standby transmission and reception frequencies 6t and 6r and telling the operator that he desires a communication with a certain traffic controller or airlines representative. The standby operator will then arrange for the desired connection in the same way as previously described.

RADIO RANGE TRANSMISSIONS

*Airway quasi-radar operation*

As previously mentioned, a direct communication of the positions, altitudes and identities of all planes flying along the airway is obtained at the western terminal of such airway by a quasi-radar facility operating with the radar reply equipment of the airplanes.

The function of the quasi-radar equipment is to send a pulse at suitable intervals from the westward airway terminal eastward on the microwave artery, such pulse being used to initiate the radiation of quasi-radar signals from each tower at the instant when such pulse passes through the tower. The quasi-radar signals radiated from each tower have such a characteristic as to exactly simulate the signals which would be received by an airplane from the rotary beacon 71 of Fig. 5 at the instant when the imaginary "sweep line" of such rotary beacon was aligned with the airplane. Thus, each airplane receiving such a quasi-radar signal from the tower west of it responds in the same way that it responds to the rotary beacon 71 when the sweep line of the latter comes into alignment with the airplane. The radar reply signals sent back from the airplane are received by equipment provided at each tower for this purpose, and are forwarded over the microwave artery to the western airway terminal where they are displayed in the oscilloscopes of the posting desks, as shown in Fig. 12.

Since the total time for the propagation of the initial pulse from the western terminal over the microwave artery to a tower just west of the airplane, and thence from the tower to the airplane, plus the time of propagation of the radar reply signal from the airplane back to the tower and thence over the microwave artery to the terminal, is proportional to the distance of the airplane from the terminal, the indicators of Fig. 12 are arranged to directly indicate the position of the airplane along the airway. In addition, the identity and altitude of the plane are indicated.

Tracing these operations in greater detail, the initial pulses are generated at a suitable rate, e. g., 180 pulses per second by pulse generator 343 in Fig. 12. The output of this pulse generator 343 passes through circuit 344 whose function is to block the transmission of quasi-radar pulses six times per second during the intervals when the radio range transmissions are being triggered from master keyer 113 in Fig. 6. For this purpose, the timing pulses delivered from such master keyer are applied to the blocking circuit 344, as indicated at 112, which is arranged to block all transmissions from generator 343 from a short interval after the receipt of any such timing pulse. Normally, however, the blocking circuit 344 will pass pulses from generator 343 to input circuit 10e of modulation equipment 351.

The application of such a pulse to input circuit 10e of modulating and channel combining equipment 351 may produce a time modulation of one of the pulses corresponding to channel 10e. Preferably, however, the pulses of channel 10e are normally all suppressed and the effect of the pulse received from generator 343 is to permit the transmission of one pulse of such channel 10e. In order to insure that generator 343 will send out its quasi-radar initiating pulse exactly at the instant when the multi-channel artery is ready for the transmission of one of the pulses of channel 10e, the modulation and channel combining equipment 351, which controls the timing of the pulses for all the channels of the microwave artery, is arranged to synchronize the generator 343 as indicated by circuit 400 from 351 to 343. Therefore, each quasi-radar initiating pulse applied to input circuit 10e from generator 343 will arrive at a suitable time so that a corresponding pulse can immediately be sent out in one of the time intervals allotted to channel 10e of the microwave artery.

The pulse transmitted over channel 10e is modulated and then radiated together with all the other pulses of the microwave artery and is repeated eastward from tower to tower in the manner previously described. Referring to Fig. 14, it will be seen that the quasi-radar pulse on channel 10e is not only repeated eastward through repeater 356, but is also applied from this repeater to drop channel circuit 374 which is arranged to select this pulse and deliver it over output 10e to the quasi-radar signal modulator 401. A preferred drop channel circuit arrangement is disclosed in the copending application of Donald D. Grieg, Serial No. 519,757, filed January 26, 1944.

The modulator 401 has the function of producing a signal which will exactly simulate the signals that would be received by an airplane from rotary beacon 71 at the instant when the sweep line of such rotary beacon was swinging past the airplane. Because of the types of signals used in the rotary beacon 71, this characteristic signal is a very simple one consisting merely of a pulse of 3 microseconds duration not immediately preceded by a pulse of 5 microseconds duration (see radar reply unit 255 of Fig. 4). Accordingly, the quasi-radar signal modulator 401 is merely a simple pulse reshaper which transmits a 3 microsecond pulse in response to the shorter pulse delivered by drop channel circuit 374.

The 3 microsecond pulse thus delivered by modulator 401 is modulated onto an F1 carrier in transmitter 391 and passes through switching circuit 392 (which is now in its normal state) to transmission line 396. Since the transmission line 396 extends to the center antenna of each group of three transmitting antennas in array 395, the quasi-radar signal is radiated eastward with a diagram which is somewhat wider than the diagrams of the radiation for the radio range signals and which is not inclined either to the right or to the left of the course. The reflecting shields of antenna array 395 serve to prevent any radiation in a westward direction, since it is not desirable for the quasi-radar signals to travel along the microwave artery past a given airplane and then back westward to such airplane.

All airplanes which are within line of sight of the tower under consideration and which lie east of such tower will receive the quasi-radar signal thus radiated and will respond thereto by sending back a radar reply pulse 3 microseconds long and a carrier frequency of $F_2$. This response will take place exactly as in the case of quasi-radar signals received from the rotating beacon 71 when the latter has ints sweep lines aligned with the airplane. In order to provide against the possibility that some airplane might respond to two quasi-radar signals received at slightly different instants of time from two different towers which are both to the west of the airplane and both within line of sight, the circuits used for radar reply in the airplane (see Figs. 3 and 4) are preferably constructed so that they cannot respond twice within an interval of 30 or 40 microseconds. For this purpose, the width selector 94 of Fig. 3 may be arranged to block itself for a short interval after the reception of any three microsecond pulse.

The radar reply signals from the airplane are propagated in all directions but are only received by the tower or towers which lie within line of sight to the west of the airplane since the receiving antennas 402, 403 in antenna array 395 (Fig. 14) are capable of receiving only from the east because of their large reflecting shields. It is possible that two towers, both west of a given airplane, may both receive the radar reply signals from such given airplane.

The radar reply signal so picked up on the two receiving antennas 402, 403 are applied to receiver 404 which is fixedly tuned to $F_2$. The demodulated 3 microsecond pulses delivered from the output of this receiver are selected by width selector 405 and applied to special channel insert circuit 406. This channel insert circuit 406 is essentially a pulse re-shaping circuit which is normally blocked, excepting during the time intervals corresponding to channels 7w, 8w, 9w and 10w.

As previously explained, the separation of the 22 channels of the multi-channel microwave artery is carried out on a time channel basis with each second of time divided into 287,500 equal intervals each of 3.48 microseconds duration. Every 23rd one of these intervals contains a synchronizing pulse of 2 microseconds width, thus leaving a group of 22 successive intervals free for communication purposes between each two synchronizing intervals. In the westbound microwave artery, the first interval of each such group of 22 is reserved for the pulses of channel 1w, while the second interval of each group is reserved for channel 2w, etc. Thus, the four time intervals reserved for channels 7w, 8w, 9w and 10w, together form a time interval about 13.9 microseconds long, beginning about 20.9 microseconds after the start of each group of time intervals. Since the total length of the group of 22 intervals is about 80 microseconds, the time allotted for channel 7w—10w amounts to 13.9 microseconds out of every 80 microseconds. Thus about 17% of every second is allotted to these 4 channels 7w—10w. The special channel insert circuit 406 is, therefore, unblocked for an interval of 13.9 microseconds every 80 microseconds, or about 17% of the time.

To correctly time the unblocked intervals of this circuit 406, a base wave generator synchronized from the westbound repeater 367 must be provided; but such synchronized base wave generator is assumed already to be provided in circuit 385 since a normal channel insert circuit usually includes such base wave generator as set forth in Deloraine application, Ser. No. 531,851. The special channel insert circuit 406, therefore, need only include (1) a pulse reshaper for converting the 3 microsecond pulses received from 405 short pulses of suitable length for transmission in the multi-channel artery (e. g. about ½ microsecond long); (2) a phase delay circuit for the base wave and (3) an arrangement for applying the phase shifted base wave to such pulse reshaper for unblocking the latter.

If the 3 microsecond pulse received from 405 arrives at a time when the pulse reshaper of special insert circuit 406 is blocked, this pulse will not pass through 406 and, therefore, the corresponding radar reply signal will be lost. About 17% of the radar reply pulses will arrive at an instant when the reshaper of special insert circuit 406 is unblocked and in such case, the radar reply pulse after reshaping to a suitable length in circuit 406 will be applied to the westbound repeater 367 and thus injected in the microwave artery.

In order to insure that the radar reply pulses coming from any one plane will be thus injected into the microwave artery a fair proportion of the time, it is only necessary to arrange that the timing of the eastbound microwave artery is slightly out of synchronization with the timing of the westbound artery, since the timing of the eastbound artery determines the exact instants when the quasi-radar pulses will be transmitted toward the airplanes while the timing of the westbound artery determines the exact instants when any tower is capable of injecting the corresponding radar reply pulse into the westbound artery. Referring to Figs. 12 and 13, it will be seen that modulation equipment 351 in Fig. 12 controls the timing of the channels of the eastbound artery, while the corresponding modulation equipment 363 in Fig. 13 similarly controls the channel timing of the westbound artery. In order to insure the required asynchronism, it is merely necessary to make the base wave generator contained in equipment 351 slightly different in frequency from that contained in equipment 363. A still more reliable and constant degree of asynchronism can be assured by taking from equipment 360 of Fig. 13 a synchronizing signal representing the timing of the eastbound artery and after passing such synchronizing signal through a frequency shifter to increase it by a small amount, using the resulting increased frequency to synchronize the base wave of equipment 363. It is preferred to have the degree of asynchronism between eastbound and westbound arteries adjusted so that the group frequency of one such artery differs from the group frequency of the other artery by about 20 to 30 cycles per second. This will insure that the radar reply signals from any given airplane will arrive with such timing as to be injected into the microwave artery at least 20 to 30 times per second.

After being injected into the westbound microwave artery each of the radar reply pulses is repeated from tower to tower toward the western terminal in the manner previously described until it is finally picked up by antenna 369, Fig. 12, received in receiver 370 and applied to channel separation and demodulation equipment 352.

Channel separation equipment 352 is arranged to deliver the pulses arriving over channels 7*w*, 8*w*, 9*w* and 10*w* without demodulation so that the arriving radar reply pulses are delivered directly from circuit 352 to the oscilloscopes 307, 308, 309.

At the instant when the quasi-radar initiating pulse was applied from generator 343 through circuit 344 to input 10*e* of modulation circuit 351, this same voltage was simultaneously applied to a blanked sweep circuit 410 so as to start the sweeping action thereof. During all the time when the quasi-radar pulse was traveling out eastward along the microwave artery to the tower west of the airplane under consideration and thence from this tower to the airplane, as well as during the corresponding return trip from the airplane to the tower and thence back to the western terminal, the sweep circuit 410 was progressively deflecting the beams of all the oscilloscopes.

Preferably, the output of this sweep circuit is divided into 15 different outputs, the first such output commencing to sweep as soon as the circuit 410 is triggered and continuing to sweep for the first fifteenth of the total sweep interval. Thereafter, this sweep voltage preferably remains fixed and the voltage of the second output commences to rise during the second fifteenth of the total sweep interval. Thereafter, the third output commences its sweep and thence the fourth, etc. Thus, the effect is as if the fifteen oscilloscopes (of which only three are shown) were all provided with one single common beam which was swept first across the first screen, next across the second screen and then across the third screen, etc. The position of the beam along the series of screens of the fifteen oscilloscopes at the instant when the radar reply pulse finally arrives at the western terminal will, therefore, be representative of the distance of the given airplane from this western terminal.

Normally, all the beams above described as sweeping across the screen of the oscilloscopes are blocked by the bias normally standing on the grids of these oscilloscopes. At the instant when the radar reply pulse is applied from circuit 352 to the grids of all these oscilloscopes, the beam is momentarily rendered effective to illuminate the appropriate portion of the screen of the appropriate tube. Thus, the position of the illuminated spot represents the distance of the airplane from the terminal.

The various combinations and subcombinations of apparatus and circuits, as particularly described, may be varied in many respects within the scope of our invention as will be clear to those skilled in the art to which it appertains.

The particular embodiment of our invention described herein shows a complete system and sub-features thereof, but should be considered only as an illustrative example and not as any limitation on our invention as defined in the objects thereof and in the accompanying claims.

We claim:

1. In an aircraft traffic control system having two terminals and a chain of multi-channel relay stations disposed along a given course between said terminals, means at one of said terminals for transmitting a plurality of groups of pulses for relay transmission through a given carrier medium along said train of stations, each group of pulses representing a different channel, means for transmitting pulse signals from aircraft in flight along said course, inserter means at at least certain of said stations for receiving and inserting said pulse signals into said carrier medium, means to control said inserter means for inserting in said carrier medium only those of said pulse signals received during predetermined time intervals, whereby at least a given percentage of said pulse signals is inserted in said carrier medium for transmission to the other of said terminals.

2. A system according to claim 1, further including means for radiating the pulses of certain channels at certain of said stations for reception by aircraft on said course, and means at said certain stations to receive and insert signal energy from said aircraft into said carrier medium for transmission to said other terminal.

3. In an aircraft traffic control system having two terminals and a chain of multi-channel relay stations disposed along a given course between said terminals, means at one of said terminals for transmitting a plurality of groups of pulses for relay transmission at a given carrier medium along said train of stations each group of pulses representing a different channel, means for transmitting given pulses from the other of said terminals for relay transmission along said chain of stations, means to radiate said given pulses at at least certain of said stations, means for transmitting reply pulses from aircraft in flight along said course, inserter means at at least certain of said stations for receiving and inserting said reply pulses into said carrier medium, means to control said inserter means for inserting in said carrier medium only those of said reply pulses received during predetermined time intervals, whereby at least a given percentage of said reply pulses is inserted in said carrier medium for transmission to said other terminal.

4. A system according to claim 3 further including means for radiating the pulses of certain channels at certain of said stations for reception by aircraft on said course, means at said certain stations to receive and insert signal energy from said aircraft into said carrier medium for transmission to said other terminal, means at said other terminal for producing a location indication of the aircraft along said course, and means at said other terminal to arrange for telephone communication with the aircraft corresponding to a particular aircraft location indication over selected channels.

5. In an aircraft traffic control system, the method of providing a plurality of services for aircraft on a single carrier frequency comprising producing a plurality of trains of pulses, timing said trains of pulses to interleave the pulses thereof to form a single train of multi-channel pulses, transmitting the multi-channel pulses at a single carrier frequency, and modulating the pulses of different channels with different types of information, said timing operation being characterized by timing the pulses of the different channels so that the service performed by the pulses of the different channels present a minimum of interference with respect to the pulses of other channels, said modulating and timing operations include modulating the pulses of one of the channels as directive beacon signals, directively transmitting the pulses of said one channel in different directions, and controlling the timing of the pulses of said one channel with respect to the pulses of the next succeeding channel to provide sufficient time interval for reception of signals from craft in reply to said beacon signals.

6. In an aircraft traffic control system, the method of providing from a ground station a plurality of services for aircraft on a minimum number of carrier frequencies comprising producing at said ground station a plurality of trains of pulses, timing said trains of pulses to interleave the pulses thereof to form a single train of multi-channel pulses, modulating the pulses of different channels with different types of information and transmitting the multi-channel pulses at a first carrier frequency; and on said craft, receiving the multi-channel pulses transmitted at said first frequency, producing trains of interleaved pulses, separately modulating the different trains of pulses with replies and other information, and modulating a second carrier frequency with the multi-channel pulses for transmission from said aircraft, the pulses of one of the channels transmitted at said second frequency comprise terrain clearance signals and the method further including the step of receiving on the aircraft at said second frequency reflections of the pulses of the terrain clearance signals.

EDMOND M. DELORAINE.
PAUL R. ADAMS.

REFERENCES CITED

The following references are of record in the file of this patent:

UNITED STATES PATENTS

| Number | Name | Date |
|---|---|---|
| 1,894,019 | Buckley | Jan. 10, 1933 |
| 2,171,293 | Plastino | Aug. 29, 1939 |
| 2,252,083 | Luck | Aug. 12, 1941 |
| 2,391,991 | Mackey | Jan. 1, 1946 |
| 2,403,210 | Butement | July 2, 1946 |
| 2,405,239 | Seeley | Aug. 6, 1946 |
| 2,405,231 | Newhouse | Aug. 6, 1946 |
| 2,406,019 | Labin | Aug. 20, 1946 |
| 2,406,468 | Loughlin | Aug. 27, 1946 |
| 2,414,265 | Lawson | Jan. 14, 1947 |
| 2,444,452 | Labin | July 6, 1948 |